(12) United States Patent
Chen et al.

(10) Patent No.: US 12,132,978 B2
(45) Date of Patent: Oct. 29, 2024

(54) TOF CAMERA MODULE, ELECTRONIC DEVICE, AND ASSEMBLY METHOD

(71) Applicant: NINGBO SUNNY OPOTECH CO., LTD., Zhejiang (CN)

(72) Inventors: Feifan Chen, Zhejiang (CN); Hangang Wei, Zhejiang (CN); Beibei Dai, Zhejiang (CN); Xiaofeng Wang, Zhejiang (CN); Qinwen Yu, Zhejiang (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 77 days.

(21) Appl. No.: 17/273,079

(22) PCT Filed: Aug. 27, 2019

(86) PCT No.: PCT/CN2019/102788
§ 371 (c)(1),
(2) Date: Mar. 3, 2021

(87) PCT Pub. No.: WO2020/048352
PCT Pub. Date: Mar. 12, 2020

(65) Prior Publication Data
US 2021/0195076 A1   Jun. 24, 2021

(30) Foreign Application Priority Data

Sep. 4, 2018   (CN) .......................... 201811027311.1
Sep. 4, 2018   (CN) .......................... 201821444740.4

(51) Int. Cl.
*H04N 23/56* (2023.01)
*G01S 17/894* (2020.01)
(Continued)

(52) U.S. Cl.
CPC ........... *H04N 23/56* (2023.01); *G01S 17/894* (2020.01); *H04N 23/54* (2023.01); *H04N 23/57* (2023.01); *H04N 23/55* (2023.01)

(58) Field of Classification Search
CPC .. H04N 5/2256; H04N 5/2253; H04N 5/2257; H04N 5/2254; G01S 17/894; G01S 7/4813; G03B 2215/05; G03B 30/00
See application file for complete search history.

(56) References Cited

U.S. PATENT DOCUMENTS

2003/0089776 A1   5/2003   Hennick et al.
2004/0132491 A1   7/2004   Kim et al.
(Continued)

FOREIGN PATENT DOCUMENTS

CN   206742240   12/2017
CN   207382424   5/2018
(Continued)

OTHER PUBLICATIONS

Extended European Search Report issued Aug. 3, 2021 in corresponding European Patent Application No. 19856963.4.
(Continued)

*Primary Examiner* — Nasim N Nirjhar
(74) *Attorney, Agent, or Firm* — Wenderoth, Lind & Ponack, L.L.P.

(57) ABSTRACT

The present invention provides a TOF camera module and electronic device and an assembly method, wherein the TOF camera module includes a floodlight module, a receiving module and a plurality of electronic components, and a part of the electronic components is conductively connected to the floodlight module, a part of the electronic components is conductively connected to the receiving module, and the receiving module provides a first circuit board and at least (Continued)

one of the plurality of electronic components is located on a back side of the first circuit board of the receiving module.

10 Claims, 6 Drawing Sheets

(51) Int. Cl.
*H04N 23/54* (2023.01)
*H04N 23/55* (2023.01)
*H04N 23/57* (2023.01)

(56) References Cited

U.S. PATENT DOCUMENTS

| | | | |
|---|---|---|---|
| 2006/0091487 A1 | 5/2006 | Hanada et al. | |
| 2010/0066307 A1* | 3/2010 | Kim | H01M 10/42 320/134 |
| 2011/0205145 A1 | 8/2011 | Lin et al. | |
| 2014/0123754 A1* | 5/2014 | Watanabe | G01P 15/09 73/514.01 |
| 2016/0174998 A1* | 6/2016 | Lal | A61B 5/4869 606/211 |
| 2017/0244877 A1* | 8/2017 | Wang | H04N 5/2258 |
| 2018/0084680 A1* | 3/2018 | Jarvis | H01M 50/20 |
| 2018/0332198 A1 | 11/2018 | Machii | |
| 2019/0141866 A1* | 5/2019 | Soler | H05K 1/115 |
| 2019/0196215 A1* | 6/2019 | Lee | G02B 27/425 |
| 2020/0000206 A1* | 1/2020 | Nichol | G01J 1/46 |
| 2020/0163258 A1* | 5/2020 | Hatano | H04N 5/22521 |
| 2020/0250403 A1* | 8/2020 | Xiao | G06K 9/00268 |
| 2021/0176449 A1* | 6/2021 | Zhang | G01S 17/89 |

FOREIGN PATENT DOCUMENTS

| | | |
|---|---|---|
| CN | 207518758 | 6/2018 |
| CN | 207782985 | 8/2018 |
| CN | 208956152 | 6/2019 |
| JP | 2002-109517 | 4/2002 |
| JP | 2007-249615 | 9/2007 |
| JP | 2016-218900 | 12/2016 |
| WO | 2017/125971 | 7/2017 |

OTHER PUBLICATIONS

International Search Report issued Nov. 29, 2019 in International (PCT) Application No. PCT/CN2019/102788 with English translation.

* cited by examiner

TOF CAMERA MODULE, ELECTRONIC DEVICE, AND ASSEMBLY METHOD

TECHNICAL FIELD

The present invention relates to field of depth information camera modules, and in particular to a TOF camera module, an electronic device and an assembly method.

TECHNICAL BACKGROUND

TOF camera module, i.e., Time of Flight, refers to the use of a sensor to emit modulated light, and then after the light encountering the object and being reflected, the sensor calculates a time difference or phase difference between the emitted light and the light reflected by the object, so that the depth information about the object is obtained.

At present, in field of electronic devices, especially mobile electronic devices, with the advancement of technology and the upgrading of consumer demand, there are more and more requirements for cameras, the consumers not only hope to obtain clear images through the camera, but also hope that the entire electronic device has more functions, for example, the camera was rear-mounted at the beginning to shoot objects, and then a flashlight was added to satisfy the consumers to use the camera in low light conditions, later a front camera is added to allow the consumers to directly capture their own images during the use of the electronic device.

Mobile electronic devices have developed much nowadays, from the beginning, they have been equipped with one camera and gradually upgraded to two cameras or even three cameras, in the future, they may be equipped with camera modules for acquiring depth information, the functions of the entire electronic device are becoming more and more powerful, its structure and design are becoming more and more complex.

Obviously, the space available for carrying functional modules in the entire electronic device is limited, the TOF camera module itself occupies more space than a single camera, because in a single TOF camera module, it includes a Floodlight and a receiving module, wherein the floodlight is used for emitting light, the receiving module is used for receiving light, the size of the receiving module is similar to the size of a normal camera, the floodlight further occupies at least part of the installation space of the electronic device.

How to save more installation space for the electronic device equipped with the TOF camera module when carrying other functional modules in the future, or how to make the electronic device carry more functional modules, is a matter of concern problem.

BRIEF SUMMARY OF THE INVENTION

An object of the present invention is to provide a TOF camera module, an electronic device, and an assembly method, wherein the TOF camera module has a smaller area size to reduce the space occupied during installation.

Another object of the present invention is to provide a TOF camera module, an electronic device and an assembly method, wherein a first circuit board of the TOF camera module has a smaller area size.

Another object of the present invention is to provide a TOF camera module, an electronic device and an assembly method, wherein the TOF camera module includes a floodlight module and a receiving module, and a second circuit board of the floodlight modules has a smaller area size.

Another object of the present invention is to provide a TOF camera module, an electronic device and an assembly method, wherein the first circuit board of the receiving module has a smaller area size.

Another object of the present invention is to provide a TOF camera module, an electronic device and an assembly method, wherein at least one electronic component of the TOF camera module is arranged on a back side of the first circuit board to reduce the area size of the TOF camera module.

Another object of the present invention is to provide a TOF camera module, an electronic device and an assembly method, wherein at least one electronic component of the floodlight is arranged on a back side of the circuit board of the receiving module to reduce the area size of the TOF camera module.

Another object of the present invention is to provide a TOF camera module, an electronic device, and an assembly method, wherein at least one electronic component of the receiving module is arranged on the back side of the circuit board of the receiving module to reduce the area size of the TOF camera module.

Another object of the present invention is to provide a TOF camera module, an electronic device and an assembly method, wherein the TOF camera module can be installed with more electronic components while maintaining a certain area size.

Another object of the present invention is to provide a TOF camera module, an electronic device and an assembly method, wherein the TOF camera module can be smaller in size while maintaining a certain number of the electronic components.

Another object of the present invention is to provide a TOF camera module, an electronic device and an assembly method, wherein a photosensitive element of the receiving module can be designed to be larger while maintaining a certain area size of the TOF camera module size.

According to one aspect of the present invention, the present invention provides a TOF camera module, wherein the TOF camera module includes:
   a floodlight module;
   a receiving module; and
   a plurality of electronic components, wherein the receiving module includes a first lens assembly, a first photosensitive element, and a first circuit board, and the first lens assembly provides an optical path for light to pass through and reach the photosensitive element to perform photoelectric conversion, the first photosensitive element is conductively connected to the first circuit board, and the floodlight module is conductively connected to the receiving module, and the first circuit board has a front side and a back side, and the first photosensitive element is located on the front side of the first circuit board, and at least a part of the plurality of electronic components is located on the back side of the first circuit board.

According to an embodiment of the present invention, the at least part of the electronic components located on the back side of the first circuit board is conductively connected to a main body of the receiving module.

According to an embodiment of the present invention, the at least part of the electronic components on the back side of the first circuit board is conductively connected to the floodlight module.

According to an embodiment of the present invention, the at least part of the electronic components located on the back side of the first circuit board are conductively connected to the main body of the receiving module, and the at least part of the electronic components located on the back side of the first circuit board are conductively connected to the floodlight module.

According to an embodiment of the present invention, the floodlight module includes a light emitting element, a bracket, and a second circuit board, wherein the light emitting element is conductively connected to the second circuit board, the bracket is supported on the second circuit board and surrounds the light-emitting element, and the floodlight module is supported on the first circuit board of the receiving module. The second circuit board of the floodlight module is directly and conductively connected to the first circuit board of the receiving module.

According to an embodiment of the present invention, further including a flexible connector, wherein the first circuit board of the floodlight module is conductively connected to the first circuit board of the receiving module through the flexible connector.

According to an embodiment of the present invention, the bracket of the floodlight module is integrally formed on the second circuit board through a ceramic sintering process.

According to an embodiment of the present invention, at least a part of the second circuit board of the floodlight module is located above the first circuit board.

According to an embodiment of the present invention, it further includes a support base, wherein the floodlight module includes a light emitting element, a bracket and a second circuit board, and the light emitting element is conductively connected to the second circuit board, the bracket is supported on the second circuit board and surrounds the light emitting element, and the support base is located between the second circuit board and the first circuit board, and the floodlight module is supported on the first circuit board through the support base.

According to an embodiment of the present invention, it further includes a conductive member, wherein the conductive member is located on the support base, and the conductive member conducts the first circuit board with the second circuit board.

According to an embodiment of the present invention, the support base has an upper surface, wherein the second circuit board is supported on the upper surface, and the support base has a groove, wherein the groove is formed on the upper surface, the conductive member has a first conductive end and a second conductive end, wherein the second conductive end is conductively connected to the second circuit board and is accommodated in the groove, and the first conductive end is conductively connected to the first circuit board.

According to an embodiment of the present invention, the conductive member is wrapped in the support base.

According to an embodiment of the present invention, further including a flexible connector, wherein the first circuit board is conductively connected to the second circuit board through the flexible connector, and the at least part of the electronic components located on the back side of the first circuit board are conductively connected to the second circuit board through the flexible connector.

According to an embodiment of the present invention, the support base is integrally formed on the second circuit board of the floodlight module through a ceramic sintering process.

According to an embodiment of the present invention, the support base, the bracket and the second circuit board are integrally formed by a ceramic sintering process.

According to an embodiment of the present invention, further including a protective member, wherein the protective member is located on the back side of the first circuit board, the protective member forms a protective cavity, and the electronic components located on the back side of the first circuit board are accommodated in the protective cavity.

According to an embodiment of the present invention, the protective member is a surrounding wall.

According to an embodiment of the present invention, it further includes a protective layer, wherein the protective layer is located in the protective cavity and covers the electronic components.

According to an embodiment of the present invention, the protective member includes a surrounding wall and a bottom wall, wherein the bottom wall covers an opening of the protective cavity.

According to an embodiment of the present invention, the protective member is integrally formed on the first circuit board through a molding process.

According to an embodiment of the present invention, a height of the protective member ranges from 0.35 mm to 0.5 mm.

According to an embodiment of the present invention, a height of the floodlight module is not greater than 4.5 mm.

According to an embodiment of the present invention, an area size range of the TOF camera module is not greater than 10.5 mm*6.6 mm.

According to an embodiment of the present invention, an area size of the TOF camera module is not greater than 12 mm*7 mm.

According to an embodiment of the present invention, the floodlight module and the receiving module have a height difference, and a range of the height difference does not exceed 0.15 mm.

According to another aspect of the invention, there is provided an electronic device including:
an electronic device main body; and
a TOF camera module described above, wherein the TOF camera module is provided in the electronic device body.

DETAILED DESCRIPTION OF EMBODIMENTS

Figure 1A:
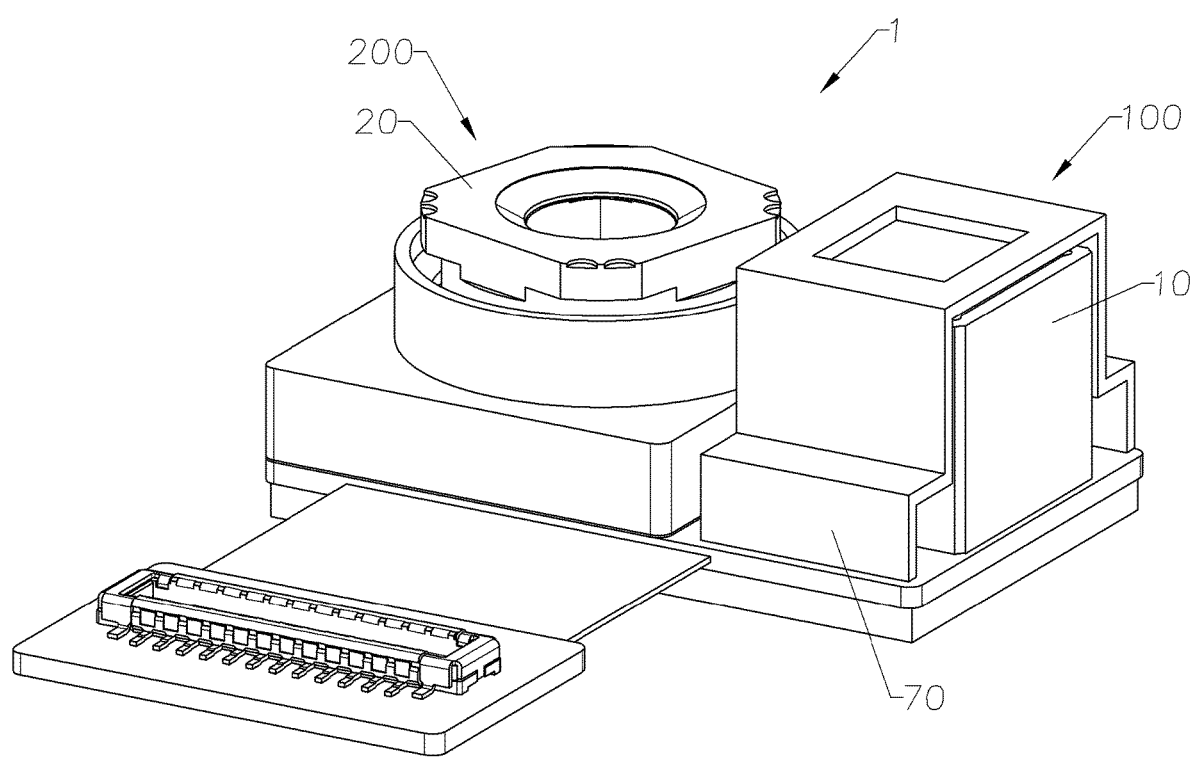
FIG. 1A is a perspective view of a TOF camera module according to a preferred embodiment of the present invention.

The following description is used to disclose the present invention so that those skilled in the art can implement the present invention. The preferred embodiments in the following description are only examples, and those skilled in the art can think of other obvious variations. The basic principles of the present invention defined in the following description can be applied to other embodiments, modifications, improvements, equivalents, and other technical solutions that do not depart from the spirit and scope of the present invention.

Those skilled in the art should understand that, in the disclosure of the present invention, the terms "longitudinal", "lateral", "upper", "lower", "front", "rear", "left", "right", "vertical", "horizontal", "top", "bottom", "inner", "outer", etc. are based on the orientation or positional relationship shown in the drawings, which is only for the convenience of describing the present invention and to simplify the description, rather than indicating or implying that the device or element referred to must have a specific orientation, be constructed and operated in a specific orientation, so the above terms should not be understood as limiting the present invention.

It can be understood that the term "a" should be understood as "at least one" or "one or more", that is, in one embodiment, the number of an element may be one, while in other embodiments, the number can be multiple, and the term "a" cannot be understood as a restriction on the number.

Figure 1B:
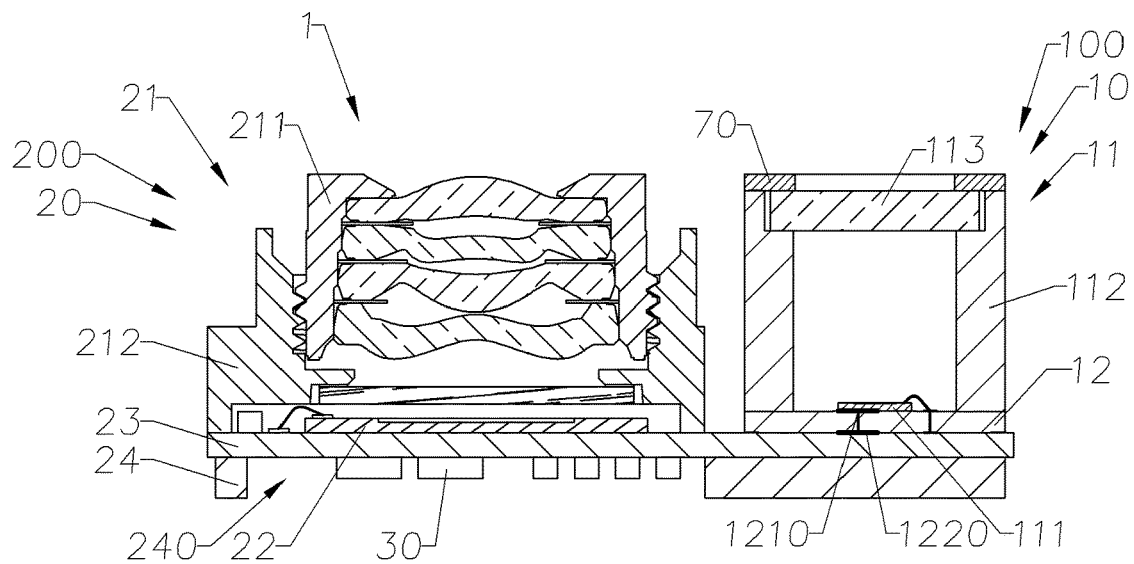
FIG. 1B is a cross-sectional view of a TOF camera module according to a preferred embodiment of the present invention.
Figure 2:
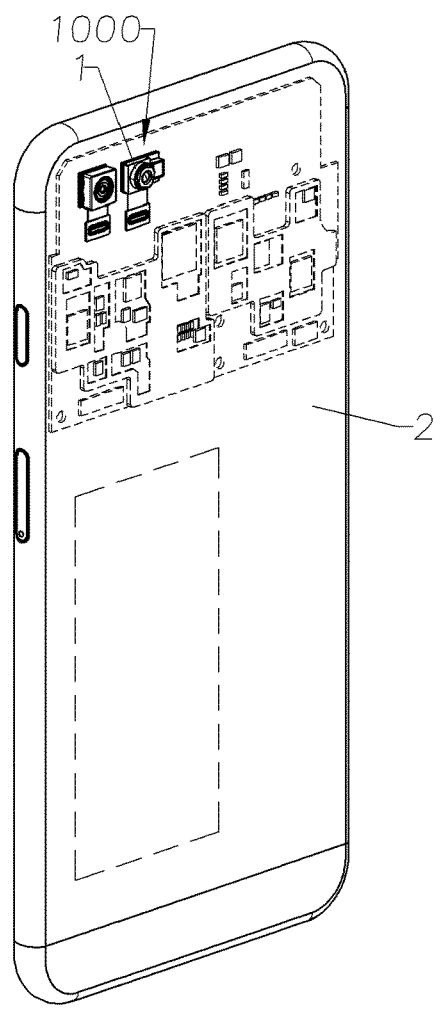
FIG. 2 is a schematic diagram of an electronic device according to a preferred embodiment of the present invention.

FIGS. 1A and 1B show a TOF camera module 1 according to a preferred embodiment of the present invention, and FIG. 2 shows an electronic device 1000 with the TOF camera module 1.

The electronic device 1000 includes an electronic device main body 2 and the TOF camera module 1, wherein the TOF camera module 1 is provided on the electronic device main body 2. The electronic device 1000 may also include at least one camera module, such as a tele-photo camera module, a medium-focus camera module, and a wide-angle camera module.

The TOF camera module 1 has a smaller area size, so the electronic device main body 2 reserves more installation space for installing the camera module or other units.

Specifically, the TOF camera module 1 includes a floodlight assembly 100 and a receiving module assembly 200, wherein the floodlight assembly 100 is conductively connected to the receiving module assembly 200, the floodlight assembly 100 is used to emit light, and the light is reflected by at least one object, and the receiving module assembly 200 receives the reflected light, so as to obtain the depth information of the object based on a time difference or a phase difference between the emitted light and the reflected light.

The TOF camera module 1 includes a floodlight module 10, a receiving module 20, and at least one electronic component 30, wherein at least one of the electronic components 30 is conductively connected to the floodlight module 10, at least one of the electronic components 30 is conductively connected to the receiving module 20, the electronic components 30 being conductive can be understood to mean that at least part of the electronic components 30 are used to support the corresponding floodlight assembly 100 or/and the receiving module assembly 200 to work.

Further, the floodlight assembly 100 includes the floodlight module 10 and at least one electronic component 30, wherein the electronic component 30 is conductively connected to the floodlight module 10. The receiving module assembly 200 includes the receiving module 20 and at least one electronic component 30, wherein the electronic component 30 is conductively connected to the receiving module 20.

The receiving module 20 includes a first lens assembly 21, a first photosensitive element 22, and a first circuit board 23, wherein the first lens assembly 21 provides an optical path for light to pass through and reach the first photosensitive element 22 to perform photoelectric conversion, and the first photosensitive element 22 is conductively connected to the first circuit board 23.

The first lens assembly 21 includes a first lens 211 and a base 212, wherein the base 212 surrounds to form a light window, and the first lens 211 is supported on the base 212 and held in a photosensitive path of the first photosensitive element 22, thus, the light passes through the first lens 211 and then reaches the first photosensitive element 22 through the light window.

The floodlight module 10 includes a projection assembly 11 and a second circuit board 12, wherein the projection assembly 11 is conductively connected to the second circuit board 12, and the second circuit board 12 is conductively connected to the first circuit board 23 of the receiving module 20. The second circuit board 12 may be a ceramic substrate, a rigid-flex board, a circuit board, or the like. In the present invention, at least a part of the second circuit board 12 of the floodlight module 10 is located above the first circuit board 23, that is, when the second circuit board 12 is orthographically projected along a height direction to the first circuit board 23, at least a part of it is located in the range of the first circuit board 23, that is, when the second circuit board 12 is projected relative to the first circuit board 23, at least part of it is located in the first circuit board 23.

The projection assembly 11 further includes a light emitting element 111 and a bracket 112, wherein the light emitting element 111 is conductively supported on the second circuit board 12, and the bracket 112 is supported on the second circuit board 12 and the bracket 112 forms an accommodating cavity, and the light-emitting element 111 is accommodated in the accommodating cavity.

The projection assembly 11 may further include an optical auxiliary element 113, wherein the optical auxiliary element 113 is supported by the bracket 112 and held in a light-emitting path of the light-emitting element 111, and after the light-emitting element 111 emits light, the light passes through the optical auxiliary element 113 and then radiates outward. The optical auxiliary element 113 may be an optical diffractive element, and the optical auxiliary element 113 is used to assist the light-emitting element 111 to radiate light outward, and the type of the optical auxiliary element 113 is not a limitation to the present invention.

Further, the bracket 112 is integrally formed on the second circuit board 12, such as integrally formed by ceramic sintering, or integrally formed by molding. The bracket 112 may also be installed on the second circuit board 12 by means of assembling. And preferably, the bracket 112 and the second circuit board 12 are integrally formed by ceramic sintering.

Figure 7A:
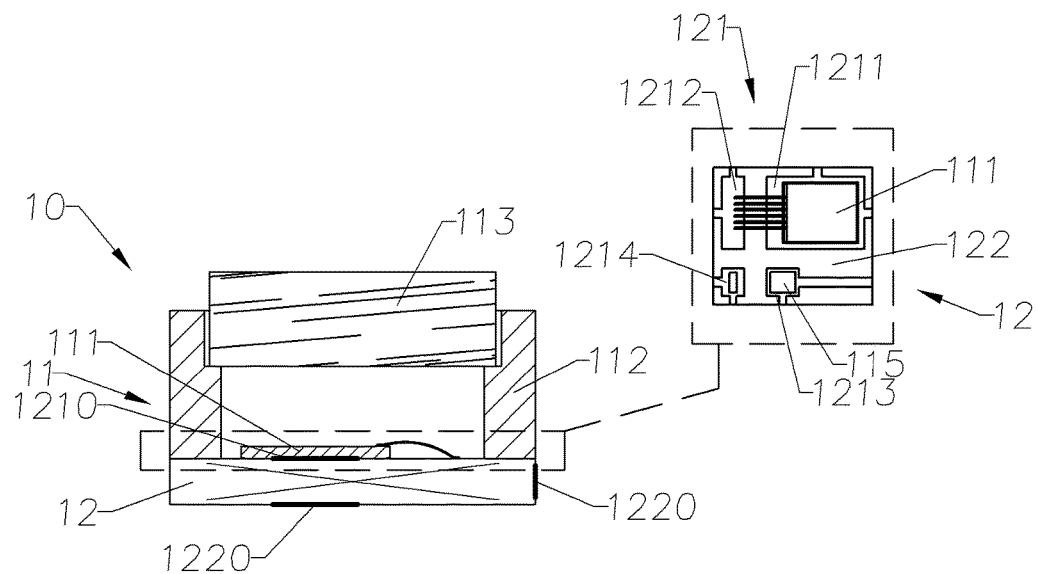
FIG. 7A is a schematic diagram of a floodlight module according to a preferred embodiment of the present invention.

Referring to FIG. 7A, the second circuit board 12 includes a conductive portion 121 and an insulating portion 122, wherein the insulating portion 122 is connected to the conductive portion 121, and the insulating portion 122 with the bracket 112 may be integrally formed on the conductive portion 121, for example, it is integrally formed by molding.

It can be understood that the bracket 112 of the floodlight module 10 and the insulating portion 122 of the second circuit board 12 may be made of same or different materials. The heat dissipation performance of the material of the second circuit board 12 of the floodlight module 10 may be better than or close to that of the material of the bracket 112. The second circuit board 12 and the bracket 112 may be integrally formed, or the bracket 112 may be attached to the second circuit board 12, how the two are formed is not a limitation to the present invention.

Further, for the entire TOF camera module 1, a height of the floodlight module 10 is generally lower than a height of the receiving module 20, and for the floodlight module 10, its height can be adjusted by a height of the bracket 112, the higher the height of the bracket 112 is, the higher is the height of the floodlight module 10, and the lower the height of the bracket 112 is, the lower is the height of the floodlight module 10.

In some embodiments of the present invention, the height of the floodlight module 10 is within 4.5 mm. In some examples of the present invention, the height of the floodlight module 10 is between 4 mm and 4.5 mm.

In this example, the second circuit board 12 of the floodlight module 10 is directly and conductively connected to the first circuit board 23 of the receiving module 20. The second circuit board 12 has a front side and a back side, wherein the front side of the second circuit board 12 is used to support the light emitting element 111, and the light emitting element 111 is conductively connected to the second circuit board 12, the back side of the second circuit board 12 is used to contact the first circuit board 23, and the second circuit board 12 is conductively connected to the first circuit board 23.

The first circuit board 23 has a front side and a back side, wherein the front side of the first circuit board 23 is conductively connected to the first photosensitive element 22, and the front side of the first circuit board 23 and the back side of the second circuit board 12 are opposed to each other.

The second circuit board 12 is provided with at least one first conductive end 1210 and at least one second conductive end 1220, wherein the first conductive end 1210 is located on the front side of the second circuit board 12, and the second conductive end 1220 is located on the back side of the second circuit board 12, the first conductive end 1210 and the second conductive end 1220 can be conducted to each other, and the first conductive end 1210 contacts conductively directly with the light-emitting element 111.

When the floodlight module 10 is installed on the first circuit board 23 of the receiving module 20, the second conductive end 1220 can be conducted to the first circuit board 23. It may be that the second conductive end 1220 can be directly conducted to a conductive end of the first circuit board 23.

Further, some of the electronic components 30 are conductively connected to the first circuit board 23 of the receiving module 20, and some of the electronic components 30 are conductively connected to the second circuit board 12 of the floodlight module 10. At least a part of the electronic component 30 is arranged on the back side of the first circuit board 23 of the receiving module 20. Preferably, at least a part of the electronic component 30 of the floodlight assembly 100 is arranged on the back side of the first circuit board 23 of the receiving module 20, for example, the electronic component 30 is implemented as a driver of the light-emitting element 111 of the floodlight module 10, and it may also be a capacitor, a resistor, or the like. In other embodiments of the present invention, the at least part of the electronic components 30 arranged on the back side of the first circuit board 23 are the electronic components 30 of the receiving module assembly 200, that is, it is used to support the operation of the receiving module 20. In other embodiments of the present invention, the at least part of the electronic components 30 arranged on the back side of the first circuit board 23 is used to support the operation of the floodlight module 10, and the others are used to support the operation of the receiving module 20.

The back side of the first circuit board 23 of the receiving module 20 may be a flat surface, and the electronic components 30 may be arranged on the first circuit board 23 by mounting. A groove may be formed on the back side of the first circuit board 23 of the receiving module 20, and the electronic component 30 can be mounted on the position of the groove, thereby lowering a thickness between the first circuit board 23 and the electronic component 30. The electronic component 30 may also be arranged on the first circuit board 23 in a manner of being at least partially covered on the first circuit board 23. Those skilled in the art can understand that the foregoing manner does not limit the connection manner between the electronic component 30 and the first circuit board 23.

In this way, a size of the second circuit board 12 of the floodlight module 10 can be reduced because an installation space reserved by the second circuit board 12 of the floodlight module 10 for the electronic component 30 can be reduced, so that an area size of the entire floodlight module 10 can be reduced, and the requirements for size can be reduced, by which the electronic device main body 2 provides an installation space of the TOF camera module 1. In other words, the electronic device main body 2 can accommodate more functional modules, such as a flashlight, and different types of camera modules, etc.

It is understandable that the electronic components 30 of the floodlight assembly 100 may be partially arranged on the back side of the first circuit board 23 of the receiving module assembly 200, that is, the electronic components 30 of the floodlight assembly 100 may also be partially arranged on the front side of the second circuit board 12 of the floodlight module 10. Whether the electronic components 30 of the floodlight assembly 100 are located on the second circuit board 12 of the floodlight module 10 or the first circuit board 23 of the receiving module assembly 200, the electronic components 30 of the floodlight assembly 100 are conductively connected to the second circuit board 12 of the floodlight module 10 to make the floodlight assembly 100 to work.

The electronic components 30 of the floodlight module 10 located on the first circuit board 23 of the receiving module assembly 200 is conductively connected to the second circuit board 12 of the floodlight module 10 through the first circuit board 23 of the receiving module assembly 200, and the electronic component 30 of the floodlight assembly 100 located on the second circuit board 12 of the floodlight module 10 contacts directly conductively to the second circuit board 12.

Further, the electronic components 30 of the receiving module assembly 200 are arranged on the front side of the first circuit board 23 of the receiving module assembly 200, and are located around the first photosensitive element 22, and are respectively conductively connected to the first circuit board 23. The electronic components 30 of the receiving module assembly 200 may be partially disposed on the back side of the first circuit board 23 of the receiving module assembly 200, thereby facilitating the reduction of the size of the first circuit board 23 of the receiving module assembly 200, because the space reserved by the first circuit board 23 of the receiving module 200 for the electronic components 30 of the receiving module assembly 200 can be reduced. The electronic components 30 of the receiving module assembly 200 located on the back side of the first circuit board 23 of the receiving module assembly 200 are conductively connected to the first circuit board 23.

The receiving module 20 further includes a protective member 24, wherein the protective member 24 is located below the first circuit board 23, and the protective member 24 forms a protective cavity 240, wherein the electronic components 30 located on the back side of the first circuit board 23 are accommodated in the protective cavity 240.

In this example, the protective member 24 is a surrounding wall, the protective member 24 extends downward from the first circuit board 12, and an opening of the protective cavity 240 is exposed to the outside, it can be directly observed on the back side of the first circuit board 12 that the electronic components 30 are installed on the back side of the first circuit board 12, in this way, on one hand, it can avoid that the contact of dust and other contaminants with the electronic component 30 located on the back side of the first circuit board 23, on the other hand, the protective member 24 keeps the electronic component 30 in a relatively suspended state, wherein the protective member 24 is preferably higher than the electronic component 30, so that when the TOF camera module 1 is installed in the electronic device main body 2, the TOF camera module 1 is supported by the protective member 24 in the electronic device main body 2, thereby preventing the electronic component 30 from being squeezed during the installation process, so that the electronic component 30 can be in a suspended state relative to the protective member 24, that is, the back side of the electronic component 30 may not be in contact with the electronic device main body 2, or the electronic component 30 does not have to withstand large squeezing. Specifically, the electronic components 30 and the protective member 24 are arranged on the back side of the first circuit board 23, and the electronic components 30 are housed in the protective cavity 240 enclosed by the protective member 24, the height of the electronic component 30 is preferably lower than the height of the protective member 24.

Figure 4A:
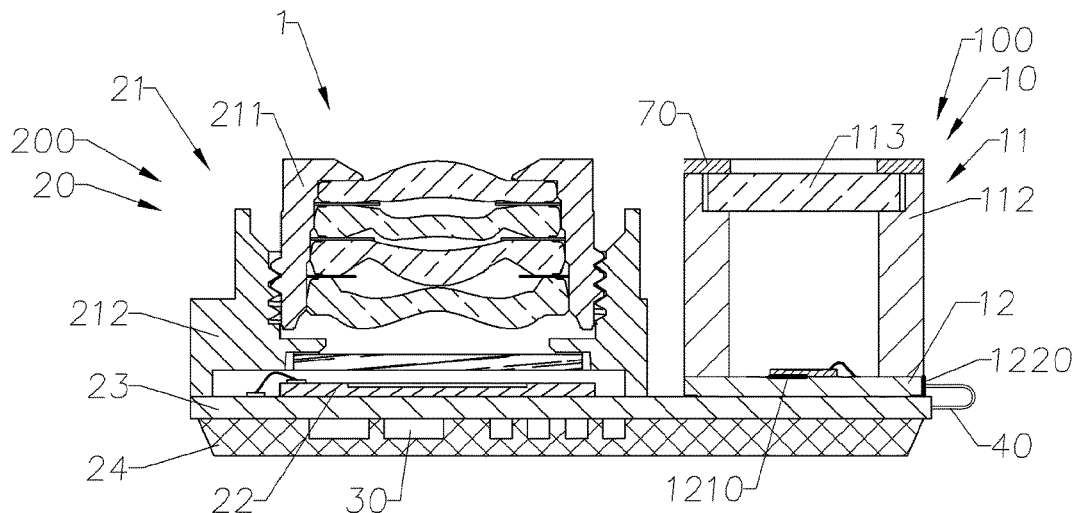
FIG. 4A is a schematic diagram of a TOF camera module according to a preferred embodiment of the present invention.
Figure 4B:
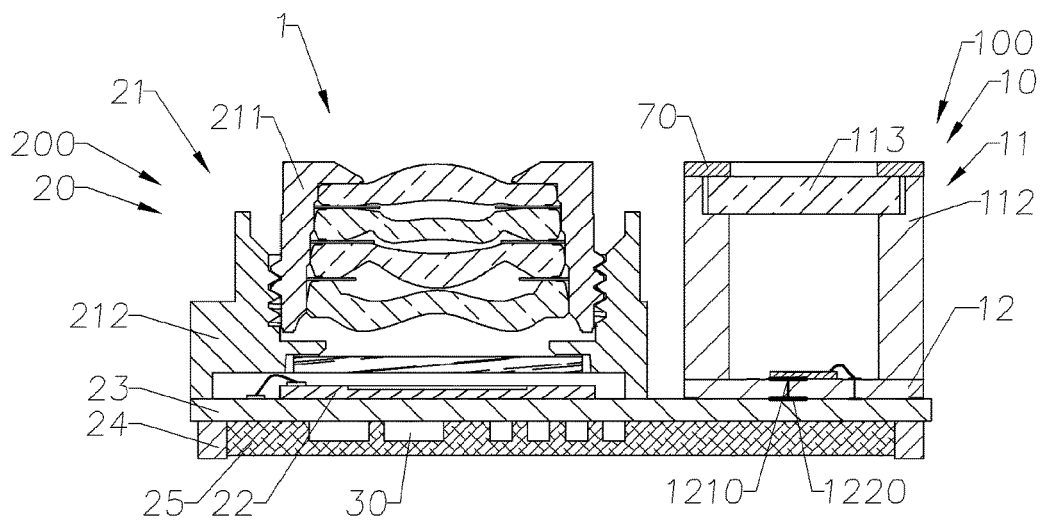
FIG. 4B is a schematic diagram of a TOF camera module according to a preferred embodiment of the present invention.

In other examples of the present invention, referring to FIG. 4B, the protective member 24 is arranged on the back side of the first circuit board 23 of the receiving module 20, and the receiving module 20 further includes a protective layer 25, wherein the protective layer 25 is located in the protective cavity 240 and is formed of a protective material. The protective material can be a protective material such as glue, the protective layer 25 can seal the electronic element 30 to a certain extent, for example, to prevent the electronic component 30 from being permeated by water or contaminated by other substances thereby affecting a normal operation of the electronic components 30.

The electronic components 30 located on the first circuit board 23 of the receiving module assembly 200 may be mounted on the back side of the first circuit board 23, or may be at least partially embedded inside the first circuit board 23. Those skilled in the art can understand that the connection between the electronic components 30 located on the first circuit board 23 of the receiving module assembly 200 and the first circuit board 23 is only an example here but not a limitation.

The protective member 24 may be installed on the back side of the first circuit board 23, or may be integrally formed with the first circuit board 23.

In some examples of the present invention, the height range of the protective member 24 is 0.35 mm-0.5 mm. In some examples of the present invention, the height of the protective member 24 is 0.45 mm.

In this example, the area size of the TOF camera module 1 is within 10.5 mm*6.6 mm. In some examples of the present invention, the area size of the TOF camera module 1 is within 20 mm*6.1 mm.

Further, the TOF camera module includes a cover 70, wherein the cover 70 is installed on the floodlight module 10 to protect the floodlight module 10, and at the same time the light radiated by the light-emitting element 111 may pass through the cover 70 to propagate outward.

The floodlight module 10 and the receiving module 20 of the TOF camera module have a height difference, the range of the height difference does not exceed 0.15 mm, that is, the height difference range of the upper surfaces of the floodlight module 10 and the receiving module 20 does not exceed 0.15 mm, the height of the floodlight module 10 may be slightly higher than the height of the receiving module 20, or the height of the floodlight module 10 may be slightly lower than the receiving module 20.

Figure 3:
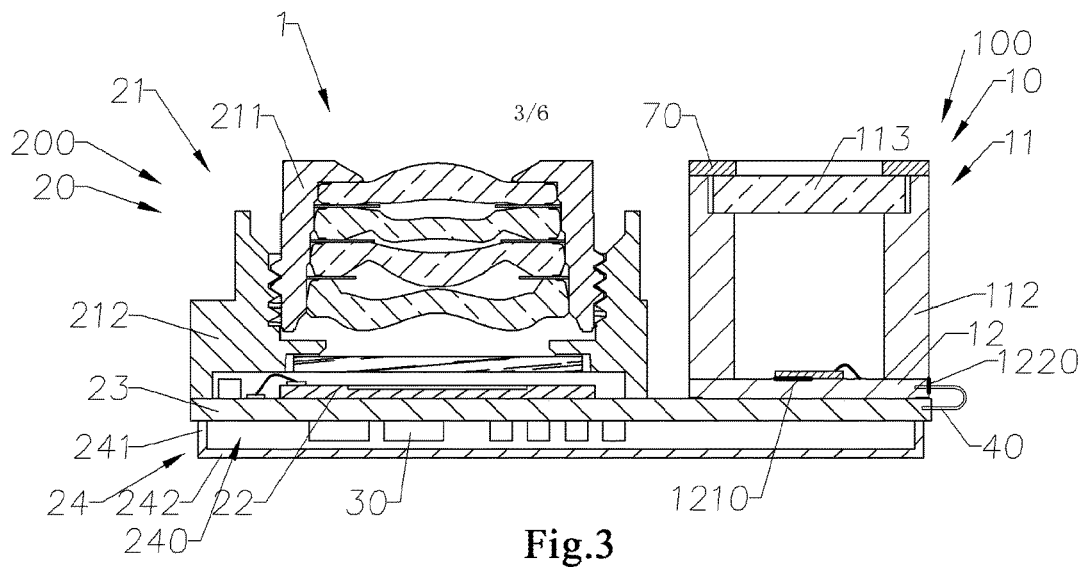
FIG. 3 is a schematic diagram of a TOF camera module according to a preferred embodiment of the present invention.

FIG. 3 shows a TOF camera module 1 according to another preferred embodiment of the present invention.

Specifically, the TOF camera module 1 includes a floodlight assembly 100 and a receiving module assembly 200, wherein the floodlight assembly 100 is conductively connected to the receiving module assembly 200, the floodlight assembly 100 is used to emit light, and the light is reflected by at least one object, and the receiving module assembly 200 receives the reflected light, so as to obtain the depth information of the object based on the time difference or the phase difference between the emitted light and the reflected light.

The TOF camera module 1 includes a floodlight module 10, a receiving module 20, and at least one electronic component 30, wherein at least one of the electronic components 30 is conductively connected to the floodlight module 10, at least one of the electronic components 30 is conductively connected to the receiving module 20.

Further, the floodlight assembly 100 includes the floodlight module 10 and at least one electronic component 30, wherein the electronic component 30 is conductively connected to the floodlight module 10.

The receiving module assembly 200 includes the receiving module 20 and at least one electronic component 30, wherein the electronic component 30 is conductively connected to the receiving module 20.

The TOF camera module 1 further includes a flexible connector 40, wherein the flexible connector 40 is respectively conductively connected to the floodlight module 10 and the receiving module 20, or in other words, the floodlight module 10 is conductively connected to the receiving module 20 through the flexible connector 40, and the receiving module 20 is conductively connected to the floodlight module 10 through the flexible connector 40.

The receiving module 20 includes a first lens assembly 21, a first photosensitive element 22, and a first circuit board 23, wherein the first lens assembly 21 provides an optical path for light to pass through and reach the first photosensitive element 22 to perform photoelectric conversion, and the first photosensitive element 22 is conductively connected to the first circuit board 23.

The first lens assembly 21 includes a first lens 211 and a base 212, wherein the base 212 surrounds to form a light window, and the first lens 211 is supported on the base 212 and held at a photosensitive path of the first photosensitive element 22, so that the light passes through the first lens 211 and then reaches the first photosensitive element 22 through the light window.

The floodlight module 10 includes a projection assembly 11 and a second circuit board 12, wherein the projection assembly 11 is conductively connected to the second circuit board 12, and the second circuit board 12 is conductively connected to the first circuit board 23 of the receiving module 20. Specifically, the second circuit board 12 of the floodlight module 10 is conductively connected to the first circuit board 23 of the receiving module through the flexible connector 40.

The projection assembly 11 further includes a light emitting element 111 and a bracket 112, wherein the light emitting element 111 is conductively supported on the second circuit board 12, and the bracket 112 is supported on the second circuit board 12 and the bracket 112 forms an accommodating cavity, and the light-emitting element 111 is accommodated in the accommodating cavity.

The projection assembly 11 may further include an optical auxiliary element 113, wherein the optical auxiliary element 113 is supported by the bracket 112 and held in a light-emitting path of the light-emitting element 111, and after the light-emitting element 111 emits light, the light passes through the optical auxiliary element 113 and then radiates outward. The optical auxiliary element 113 may be an optical diffractive element, and the optical auxiliary element 113 is used to assist the light-emitting element 111 to radiate light outward, and the type of the optical auxiliary element 113 is not a limitation to the present invention.

Further, the bracket 112 is integrally formed on the second circuit board 12, such as being integrally formed by ceramic sintering, or being integrally formed by molding. The bracket 112 may also be installed on the second circuit board 12 by means of assembling. In this example, the bracket 112 is integrally formed on the second circuit board 12 by the ceramic sintering.

Referring to FIG. 7A, the second circuit board 12 includes a conductive portion 121 and an insulating portion 122, wherein the insulating portion 122 is connected to the conductive portion 121, and the insulating portion 122 may be integrally formed with the bracket 112 on the conductive portion 121, such as being integrally formed by molding, or by ceramic sintering.

It can be understood that the bracket 112 of the floodlight module 10 and the insulating portion 122 of the second circuit board 12 may be made of same or different materials. The heat dissipation performance of the material of the second circuit board 12 of the floodlight module 10 may be better than or close to that of the material of the bracket 112.

Further, for the entire TOF camera module 1, the height of the floodlight module 10 is generally lower than the height of the receiving module assembly 200, for the floodlight module 10, its height can be adjusted by the height of the bracket 112, the higher the height of the bracket 112 is, the higher is the height of the floodlight module 10, and the lower the height of the bracket 112 is, the lower is the height of the floodlight module 10.

In some embodiments of the present invention, the height of the floodlight module 10 is within 4.5 mm. In some examples of the present invention, the height of the floodlight module 10 is between 4 mm and 4.5 mm.

In some examples of the present invention, the thickness of the first circuit board 23 of the receiving module 20 is within 0.4 mm, and may be 0.35 mm. The number of layers of the first circuit board 23 may be 3 to 7 layers, for example, 6 layers.

In this example, the second circuit board 12 of the floodlight module 10 is conductively connected to the first circuit board 23 of the receiving module 20 through the flexible connector 40. The second circuit board 12 has a front side and a back side, wherein the front side of the second circuit board 12 is used to support the light emitting element 111, and the light emitting element 111 is conductively connected to the second circuit board 12.

The first circuit board 23 has a front side and a back side, wherein the front side of the first circuit board 23 is conductively connected to the first photosensitive element 22, and the front side of the first circuit board 23 and the back side of the second circuit board 12 are opposed to each other.

The second circuit board 12 is provided with at least one first conductive end 1210 and at least one second conductive end 1220, wherein the first conductive end 1210 is located on the front side of the second circuit board 12, and the second conductive ends 1220 are located on a side surface of the second circuit board 12, the first conductive ends 1210 and the second conductive ends 1220 can be conducted to each other, and the first conductive ends 1210 are conductively and directly contacted with the light-emitting element 111. In this example, the first conductive end 1210 is formed on an upper surface of the conductive portion 121, and the second conductive end 1220 is formed on a side surface of the conductive portion 121.

When the floodlight module 10 is installed on the first circuit board 23 of the receiving module 20, the second conductive end 1220 can be conducted to the first circuit board 23. In this example, the second conductive end 1220 is conducted to the first circuit board 23 through the flexible connector 40.

The second conductive end 1220 may be located on the back surface or the side surface of the second circuit board 12.

In this example, the floodlight module 10 is still installed on the first circuit board 23 of the receiving module 20, but the main body of the floodlight module 10 and the receiving module 20 are connected to each other through the flexible connector 40, such as a soft board.

Further, a part of the electronic components 30 are conductively connected to the first circuit board 23 of the receiving module 20, and a part of the electronic components 30 are conductively connected to the second circuit board 12 of the floodlight module 10. The at least part of the electronic component 30 that is conductively connected to the floodlight module 10 is arranged on the back side of the first circuit board 23 of the receiving module 20. In this way, the size of the second circuit board 12 of the floodlight module 10 can be reduced because the installation space reserved by the second circuit board 12 of the floodlight module 10 for the electronic component 30 can be reduced, so that an area size of the entire floodlight module 10 can be reduced, and the requirements of the installation space provided by the electronic device main body 2 for the TOF camera module 1 can be reduced. In other words, the electronic device main body 2 can accommodate more functional modules, such as a flashlight, and different types of camera modules, etc.

It is understandable that the electronic components 30 of the floodlight assembly 100 may be partially arranged on the back side of the first circuit board 23 of the receiving module 29, that is, the electronic components 30 of the floodlight assembly 100 may also be partially arranged on the front side of the second circuit board 12 of the floodlight module 10. Regardless of whether the electronic components 30 of the floodlight 10 are located on the second circuit board 12 of the floodlight module 10 or the first circuit board 23 of the receiving module 20, the electronic components 30 of the floodlight assembly 100 are conductively connected to the second circuit board 12 of the floodlight module 10. The electronic components 30 of the floodlight module 10 located on the first circuit board 23 of the receiving module 20 can be connected to the second circuit board 12 of the floodlight module 10 through the first circuit board 23 of the receiving module 20, the electronic components 30 of the floodlight assembly 100 located on the second circuit board 12 of the floodlight module 10 is directly and conductively contacted with the second circuit board 12.

Further, the electronic components 30 of the receiving module assembly 200 are arranged on the front side of the first circuit board 23 of the receiving module 20, and located around the first photosensitive element 22, and are respectively conductively connected to the first circuit board 23. The electronic components 30 of the receiving module assembly 200 may be partially arranged on the back side of the first circuit board 23 of the receiving module 20, thereby facilitating to reduce the size of the first circuit board 23 of the receiving module 20, because the installation space reserved by the first circuit board 23 of the receiving module 20 for the electronic components 30 of the receiving module assembly 200 can be reduced. The electronic components 30 of the receiving module assembly 200 located on the back side of the first circuit board 23 of the receiving module 20 are conductively connected to the first circuit board 23.

The receiving module 20 further includes a protective member 24, wherein the protective member 24 is located below the first circuit board 23, and the protective member 24 forms a protective cavity 240, wherein the electronic components 30 located on the back side of the first circuit board 23 are accommodated in the protective cavity 240.

In this way, on one hand, dust and other contaminants can be prevented from contacting the electronic components 30 located on the back side of the first circuit board 23, and on the other hand, the protective member 24 keeps the electronic components 30 in a suspended state.

It is worth mentioning that, in this example, the protective member 24 includes a protective surrounding wall 241 and a protective bottom wall 242, the protective surrounding wall 241 surrounds the protective cavity 240, and the protective bottom wall 242 closes an opening of the protective cavity 240, the protective bottom wall 242 is connected to the protective surrounding wall 241, so that the contaminants cannot enter the protective cavity 240 from a bottom side upwards to cause a contamination to the electronic components 30.

The electronic components 30 located on the first circuit board 23 of the receiving module 20 may be mounted on the back side of the first circuit board 23, or may be at least partially covered on the first circuit board 23. Those skilled in the art can understand that the connection between the electronic components 30 located on the first circuit board 23 of the receiving module 20 and the first circuit board 23 here is only an example but not a limitation.

The protective member 24 may be installed on the back side of the first circuit board 23, or may be integrally formed with the first circuit board 23.

It is understandable that the protective member 24 can be made of metal material, so that the TOF camera module 1 can be grounded through the protective member 24, thereby further improving a grounding performance of the TOF camera module 1, and at the same time, the protective member 24 made of metal material can also enhance the heat dissipation performance of the position. On one hand, it can help the first circuit board 23 to dissipate heat, and on the other hand, it can also help the electronic component 30 located on the front side of the first circuit board 23 or the back side of the first circuit board 23 dissipate heat.

Further, the TOF camera module includes a cover 70, wherein the cover 70 is installed on the floodlight module 10 to protect the floodlight module 10, and at the same time, the light radiated by the light-emitting element 111 may pass through the cover 70 to propagate outward.

FIGS. 4A and 4B respectively show a modified embodiment of the TOF camera module 1 in the above preferred embodiment, in the example shown in FIG. 4A, the protective member 24 is integrally formed on the first circuit board 23 of the receiving module 20, and is located on the back side of the first circuit board 23.

The first circuit board 23 of the receiving module 20 is conductively connected to the second circuit board 12 of the floodlight module 10 through the flexible connector 40.

The electronic components 30 located on the first circuit board 23 of the receiving module 20 are embedded by the protective member 24 during the integral forming process of the protective member 24. In this way, not only can the electronic components 30 be protected, but also a flat surface can be provided. The bottom side of the protective member 24 is the bottom surface of the TOF camera module 1, so that the bottom surface of the TOF camera module 1 formed by a molding process can be a flat surface, which is convenient for subsequent installation of the TOF camera module 1 and other equipments described.

Optionally, the protective member 24 may be integrally formed on the back side of the first circuit board 23 by molding. The protective member 24 formed by the molding process has a slope, which facilitates the demolding of upper and lower molding die during the molding process.

Further, in this example, the bracket 112 and the second circuit board 12 are separately formed, that is, the bracket 112 is installed on the second circuit board 12, such as in a way of adhering.

In the example shown in FIG. 4B, the protective member 24 is provided on the back side of the first circuit board 23 of the receiving module 20.

The second circuit board 12 of the floodlight module 10 is directly and conductively connected to the first circuit board 23 of the receiving module 20.

The receiving module 20 further includes a protective layer 25, wherein the protective layer 25 fills the position of the protective cavity 240 and is formed of a protective material, the protective material may be a protective material such as glue, the protective layer 25 can seal the electronic component 30 to a certain extent, for example, to prevent the electronic component 30 from being contaminated by water or other substances thereby affecting the normal operation of the electronic component 30. The thickness of the protective layer 25 may be higher or lower than the height of the protective member 24, and may also be equal to the height of the protective member 24.

Figure 5A:
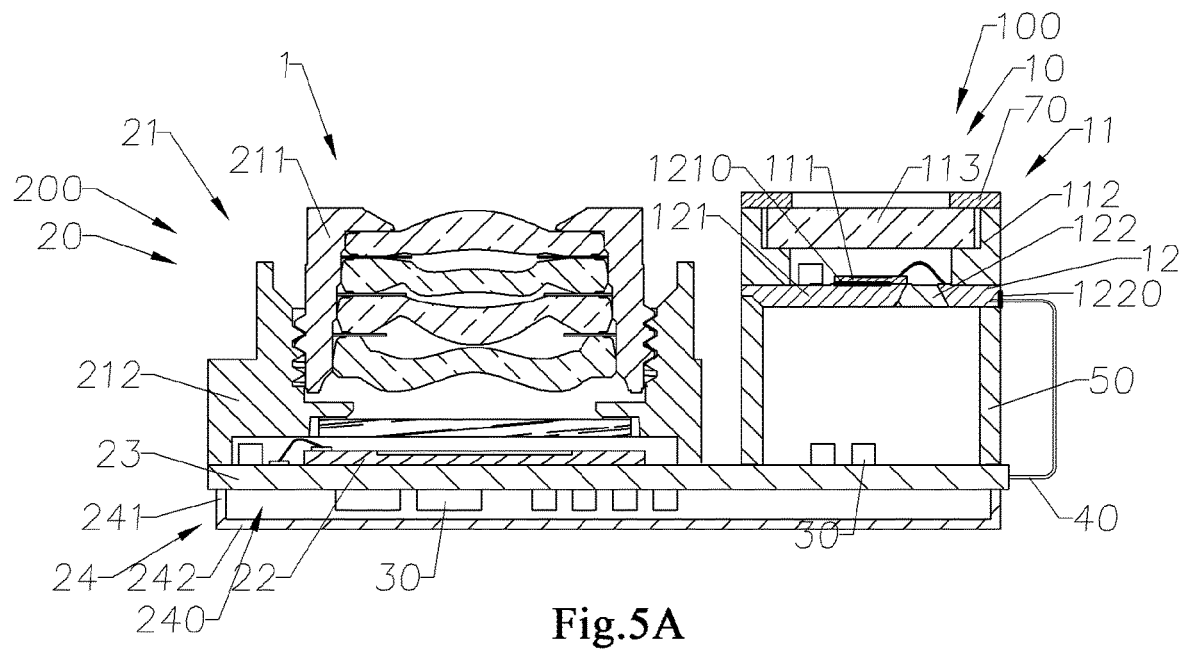
FIG. 5A is a schematic diagram of a TOF camera module according to a preferred embodiment of the present invention.

FIG. 5A shows a TOF camera module 1 according to a preferred embodiment of the present invention.

Specifically, the TOF camera module 1 includes a floodlight assembly 100 and a receiving module assembly 200, wherein the floodlight assembly 100 is conductively connected to the receiving module assembly 200, so the floodlight assembly 100 is used to emit light, and the light is reflected by at least one object, and the receiving module assembly 200 receives the reflected light, so as to obtain the depth information of the object based on a time difference or a phase difference between the emitted light and the reflected light.

The TOF camera module 1 includes a floodlight module 10, a receiving module 20, and at least one electronic component 30, wherein at least one of the electronic components 30 is conductively connected to the floodlight module 10, at least one of the electronic components 30 is conductively connected to the receiving module 20.

Further, the floodlight assembly 100 includes the floodlight module 10 and at least one electronic component 30, wherein the electronic component 30 is conductively connected to the floodlight module 10. The receiving module assembly 200 includes the receiving module 20 and at least one electronic component 30, wherein the electronic component 30 is conductively connected to the receiving module 20.

In another modified embodiment of the present invention, at least one of the electronic components 30 is arranged on the back side of the second circuit board 12 of the floodlight module 10.

The TOF camera module 1 further includes a flexible connector 40, wherein the flexible connector 40 is respectively conductively connected to the floodlight module 10 and the receiving module 20, or in other words, the floodlight module 10 is conductively connected to the receiving module 20 through the flexible connector 40, and the receiving module 20 is conductively connected to the floodlight module 10 through the flexible connector 40.

The TOF camera module 1 further includes a support base 50, wherein the support base 50 supports the floodlight module 10 on the receiving module 20, and the floodlight module 10 and the receiving module 20 are connected to each other through the support base 50.

It is worth noting that in this example, the support base 50 is a hollow structure.

The receiving module 20 includes a first lens assembly 21, a first photosensitive element 22, and a first circuit board 23, wherein the first lens assembly 21 provides an optical path for light to pass through and reach the first photosensitive element 22 to perform photoelectric conversion, and the first photosensitive element 22 is conductively connected to the first circuit board 23.

The first lens assembly 21 includes a first lens 211 and a base 212, wherein the base 212 surrounds to form a light window, and the first lens 211 is supported on the base 212 and held in a photosensitive path of the first photosensitive element 22, so that the light passes through the first lens 211 and then reaches the first photosensitive element 22 through the light window.

The floodlight module 10 includes a projection assembly 11 and a second circuit board 12, wherein the projection assembly 11 is conductively connected to the second circuit board 12, and the second circuit board 12 is conductively connected to the first circuit board 23 of the receiving module 20. The second circuit board 12 may be a ceramic substrate, a rigid-flex board, a circuit board, or the like.

The projection assembly 11 further includes a light emitting element 111 and a bracket 112, wherein the light emitting element 111 is conductively supported on the second circuit board 12, and the bracket 112 is supported on the second circuit board 12 and the bracket 112 forms an accommodating cavity, and the light-emitting element 111 is accommodated in the accommodating cavity.

The projection assembly 11 may further include an optical auxiliary element 113, wherein the optical auxiliary element 113 is supported by the bracket 112 and held in a light-emitting path of the light-emitting element 111, and after the light-emitting element 111 emits light, the light passes through the optical auxiliary element 113 and then radiates outward. The optical auxiliary element 113 may be an optical diffractive element, and the optical auxiliary element 113 is used to assist the light-emitting element 111 to radiate light outward, the type of the optical auxiliary element 113 is not a limitation to the present invention.

Further, the bracket 112 may be integrally formed on the second circuit board 12, such as by ceramic sintering. The bracket 112 may also be installed on the second circuit board 12 by means of assembling.

The second circuit board 12 includes a conductive portion 121 and an insulating portion 122, wherein the insulating portion 122 is connected to the conductive portion 121, and the insulating portion 122 and the bracket 112 can be integrally formed on the conductive portion 121, such as by molding or ceramic sintering.

It can be understood that the bracket 112 of the floodlight module 10 and the insulating portion 122 of the second circuit board 12 may be made of same or different materials. The heat dissipation performance of the material of the second circuit board 12 of the floodlight module 10 may be better than or close to that of the material of the bracket 112.

Further, for the entire TOF camera module 1, the height of the floodlight module 10 is generally lower than the height of the receiving module 20, and for the floodlight module 10, its height can be adjusted by the height of the bracket 112, the higher the height of the bracket 112 is, the higher is the height of the floodlight module 10, and the lower the height of the bracket 112 is, the lower is the height of the floodlight module 10.

In some embodiments of the present invention, the height of the floodlight module 10 is within 4.5 mm. In some examples of the present invention, the height of the floodlight module 10 is between 4 mm and 4.5 mm.

In this example, the second circuit board 12 of the floodlight module 10 is conductively connected to the first circuit board 23 of the receiving module 20 through the flexible connector 40 located in the support base 50.

The second circuit board 12 is provided with at least one first conductive end 1210 and at least one second conductive end 1220, wherein the first conductive end 1210 is located on the front side of the second circuit board 12, and the second conductive ends 1220 are located on a side of the second circuit board 12, the first conductive ends 1210 and the second conductive ends 1220 can be connected to each other, and the first conductive ends 1210 can be conductively directly contacted to the light-emitting element 111.

When the floodlight module 10 is installed on the first circuit board 23 of the receiving module 20, the second conductive end 1220 can be conducted to the first circuit board 23. In this example, the second conductive end 1220 is conducted to the first circuit board 23 through the flexible connector 40.

The support base 50 can be made by injection molding, molding, ceramic die-casting and other processes.

It is worth mentioning that in this example, the support base 50 is integrally formed on the second circuit board 12 of the floodlight module 10.

It is understandable that the second circuit board 12 itself can be manufactured through an integrated manufacturing process such as injection molding, molding, and ceramic sintering, the production materials of the support base 50 and the insulating portion 122 of the second circuit board 12 can be different. After the second circuit board 12 is integrally formed, the support base 50 is integrally formed on the second circuit board 12. Preferably, the second circuit board 12 is integrally formed by ceramic sintering.

The support base 50 and the insulating portion 122 may also be integrally formed on the conductive portion 121, that is, the support base 50 and the insulating portion 122 of the second circuit board 12 may be integrally formed. This method is beneficial to the connection strength between the support base 50 and the floodlight module 20.

Further, a part of the electronic components 30 are conductively connected to the first circuit board 23 of the receiving module 20, and a part of the electronic components 30 are conductively connected to the second circuit board 12 of the floodlight module 10. At least part of the electronic component 30 that is conductively connected to the floodlight module 10 is arranged on the back side of the first circuit board 23 of the receiving module 20. In this way, the size of the second circuit board 12 of the floodlight module 10 can be reduced because the installation space reserved by the second circuit board 12 of the floodlight module 10 for the electronic component 30 can be reduced, so that an area size of the entire floodlight module 10 can be reduced, and the requirements of the installation space provided by the electronic device main body 2 for the TOF camera module 1 can be reduced. In other words, the electronic device main body 2 can accommodate more functional modules, such as a flashlight, and different types of camera modules, etc.

It is understandable that the electronic components 30 of the floodlight assembly 100 may be partially arranged on the back side of the first circuit board 23 of the receiving module 20, that is, the electronic components 30 of the floodlight assembly 100 may also be partially arranged on the front side of the second circuit board 12 of the floodlight module 10. Regardless of whether the electronic components 30 of the floodlight assembly 100 are located on the second circuit board 12 of the floodlight module 10 or the first circuit board 23 of the receiving module 20, the electronic components 30 of the floodlight assembly 100 are conductively connected to the second circuit board 12 of the floodlight module 10. The electronic components 30 of the floodlight assembly 100 located on the first circuit board 23 of the receiving module 20 are conductively connected to the second circuit board 12 of the floodlight module 10 through the first circuit board 23 of the receiving module 20 and the the flexible connector 40, and the electronic components 30 of the floodlight assembly 100 located on the second circuit board 12 of the floodlight module 10 are directly and conductively contacted to the second circuit board 12.

Further, the electronic components 30 of the receiving module assembly 200 are arranged on the front side of the first circuit board 23 of the receiving module 20, and located around the first photosensitive element 22, and are respectively conductively connected to the first circuit board 23. The electronic components 30 of the receiving module assembly 200 may be partially arranged on the back side of the first circuit board 23 of the receiving module 20, thereby facilitating to reduce the size of the first circuit board 23 of the receiving module 20, because the installation space reserved by the first circuit board 23 of the receiving module 20 for the electronic components 30 of the receiving module assembly 200 can be reduced. The electronic components 30 of the receiving module assembly 200 located on the back side of the first circuit board 23 of the receiving module 20 are conductively connected to the first circuit board 23.

The receiving module 20 further includes a protective member 24, wherein the protective member 24 is located below the first circuit board 23, and the protective member 24 forms a protective cavity 240, wherein the electronic components 30 located on the back side of the first circuit board 23 are accommodated in the protective cavity 240. On one hand, this can prevent dust and other contaminants from contacting the electronic components 30 located on the back side of the first circuit board 23, and on the other hand, the protective member 24 keeps the electronic component 30 in a suspended state.

Specifically, the protective member 24 has a bottom side, the electronic component 30 has a front side and a back side, wherein the front side of the electronic component 30 is connected to the back side of the first circuit board 23 of the receiving module 20, the back side of the electronic component 30 is exposed in the protective cavity 240, and the position of the bottom side of the protective member 24 is lower than the back side of the electronic component 30, so that when the TOF camera module 1 is installed on a circuit board of the electronic device main body 2, the TOF camera module 1 is supported on the electronic device main body 2 via the bottom side of the protective member 24, thereby preventing the electronic component 30 from being squeezed during the installation process, so that the electronic component 30 can be in a suspended state relative to the protective member 24, that is, the back side of the electronic component 30 may not be in contact with the electronic device main body 2, or the back side of the electronic component 30 may not have to bear large squeezing.

The electronic components 30 located on the first circuit board 23 of the receiving module 20 may be mounted on the back side of the first circuit board 23, or may be at least partially covered on the first circuit board 23. Those skilled in the art can understand that the connection between the electronic components 30 located on the first circuit board 23 of the receiving module 20 and the first circuit board 23 here is only an example but not a limitation.

The protective member 24 may be installed on the back side of the first circuit board 23, or may be integrally formed with the first circuit board 23.

In some examples of the present invention, the range of the height of the protective member 24 is 0.35 mm~0.5 mm. In some examples of the present invention, the height of the protective member 24 is 0.45 mm.

In this example, the area size of the TOF camera module 1 is within 12 mm*7 mm. In some examples of the present invention, the area size of the TOF camera module 1 is within 11.6 mm*6.5 mm.

Further, the TOF camera module includes a cover 70, wherein the cover 70 is installed on the floodlight module 10 to protect the floodlight module 10, and at the same time, the light radiated by the light-emitting element 111 may pass through the cover 70 to propagate outward.

Figure 5B:
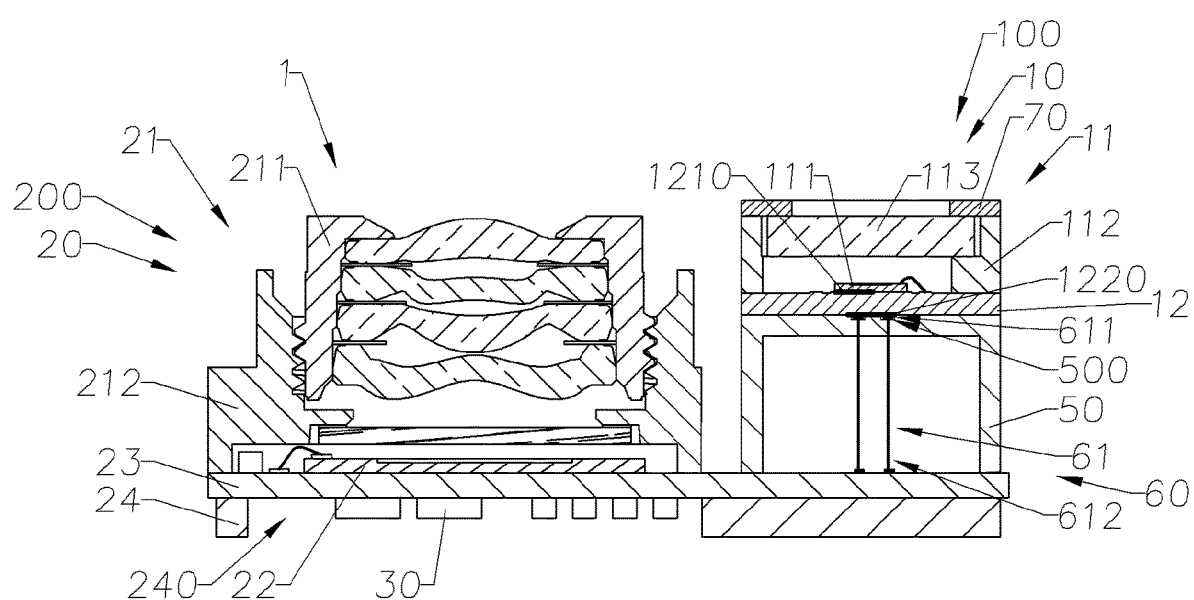
FIG. 5B is a schematic diagram of a TOF camera module according to a preferred embodiment of the present invention.

FIG. 5B shows a modified embodiment of the TOF camera module 1 according to the above-mentioned preferred embodiment of the present invention.

Specifically, the TOF camera module 1 includes a floodlight assembly 100 and a receiving module assembly 200, wherein the floodlight assembly 100 is conductively connected to the receiving module assembly 200, the floodlight assembly 100 is used to emit light, and the light is reflected by at least one object, and the receiving module assembly 200 receives the reflected light, so as to obtain the depth information of the object based on a time difference or a phase difference between the emitted light and the reflected light.

The TOF camera module 1 includes a floodlight module 10, a receiving module 20, and at least one electronic component 30, wherein at least one of the electronic components 30 is conductively connected to the floodlight module 10, and at least one of the electronic components 30 is conductively connected to the receiving module 20.

Further, the floodlight assembly 100 includes the floodlight module 10 and at least one electronic component 30, wherein the electronic component 30 is conductively connected to the floodlight module 10. The receiving module assembly 200 includes the receiving module 20 and at least one electronic component 30, wherein the electronic component 30 is conductively connected to the receiving module 20.

The TOF camera module 1 further includes a support base 50, wherein the support base 50 supports the floodlight module 10 on the receiving module 20. It is worth noting that in this example, the support base 50 has a hollow structure.

The TOF camera module 1 further includes a conductive member 60, wherein the conductive member 60 includes a conductive body 61 and has a first connection end 611 and a second connection end 612, and the first connection end 611 and the second connecting ends 612 are respectively located at two ends of the conductive body 61 and are conducted to the floodlight module 10 and the receiving module 20 respectively. The conductive body 61 can transmit electrical signals. The support base 50 is integrally formed on the conductive member 60. It is worth mentioning that the conductive member 60 in the present invention may be a straight wire, so that the floodlight module 10 can communicate with the receiving module 20; the conductive element 60 may also be implemented as a multilayer to be arranged inside the support body 50 to implement conduction.

The support base 50 may be obtained by injection molding, molding, ceramic die-casting and other processes, and the conductive member 60 is wrapped by injection molding material, molding material or ceramic die-casting material.

The receiving module 20 includes a first lens assembly 21, a first photosensitive element 22, and a first circuit board 23, wherein the first lens assembly 21 provides an optical path for light to pass through and reach the first photosensitive element 22 to perform photoelectric conversion, and the first photosensitive element 22 is conductively connected to the first circuit board 23.

The first lens assembly 21 includes a first lens 211 and a base 212, wherein the base 212 surrounds to form a light window, and the first lens 211 is supported on the base 212 and held at a photosensitive path of the first photosensitive element 22, so that the light passes through the first lens 211 and then reaches the first photosensitive element 22 through the light window.

In this example, the first lens assembly 21 and the floodlight module 10 are independently held on the first circuit board 23 respectively. In other words, there is no physical contact between the first lens assembly 21 and the floodlight module 10 in space.

Optionally, the support base 50 may be integrally formed on the base 212, and in a length direction, the base 212 and the support base 50 respectively provide a solid support for the first lens 211 and the floodlight module 10. The integrated support base 50 and the base 212 make the combination between the two more stable.

Further, in this example, the floodlight module 10 includes a projection assembly 11 and a second circuit board 12, wherein the projection assembly 11 is conductively connected to the second circuit board 12; the second circuit board 12 is conductively connected to the first circuit board 23 of the receiving module 20. Specifically, the second circuit board 12 of the floodlight module 10 is conductively connected to the first circuit board 23 of the receiving module 20 through the conductive member 60. The second circuit board 12 may be a ceramic substrate, a rigid-flex board, a circuit board, or the like.

The projection assembly 11 further includes a light emitting element 111 and a bracket 112, wherein the light emitting element 111 is conductively supported on the second circuit board 12, and the bracket 112 is supported on the second circuit board 12 and the bracket 112 forms an accommodating cavity, wherein the light-emitting element 111 is accommodated in the accommodating cavity.

The projection assembly 11 may further include an optical auxiliary element 113, wherein the optical auxiliary element 113 is supported by the bracket 112 and held in a light-emitting path of the light-emitting element 111, and after the light-emitting element 111 emits light, the light passes through the optical auxiliary element 113 and then radiates outward. The optical auxiliary element 113 may be an optical diffractive element, and the optical auxiliary element 113 is used to assist the light emitting element 111 to radiate light outward, and the type of the optical auxiliary element 113 is not a limitation to the present invention.

Further, the bracket 112 may be integrally formed on the second circuit board 12, such as by ceramic sintering. The bracket 112 may also be installed on the second circuit board 12 by means of assembling.

Further, for the entire TOF camera module 1, the height of the floodlight module 10 is generally lower than the height of the receiving module 20, and for the floodlight module 10, the height can be adjusted by the height of the bracket 112, the higher the height of the bracket 112 is, the higher is the height of the floodlight module 10, and the lower the height of the bracket 112 is, the lower is the height of the floodlight module 10.

In some embodiments of the present invention, the height of the floodlight module 10 is within 4.5 mm. In some examples of the present invention, the height of the floodlight module 10 is between 4 mm and 4.5 mm.

In this example, the second circuit board 12 of the floodlight module 10 is conductively connected to the first circuit board 23 of the receiving module 20 through the conductive member 60. The second circuit board 12 has a front side and a back side, wherein the front side of the second circuit board 12 is used to support the light emitting element 111, and the light emitting element 111 is conductively connected to the second circuit board 12.

The first circuit board 23 of the receiving module 20 has a front side and a back side, wherein the front side of the first circuit board 23 is conductively connected to the first photosensitive element 22.

The second circuit board 12 is provided with at least one first conductive end 1210 and at least one second conductive end 1220, wherein the first conductive end 1210 is located on the front side of the second circuit board 12, and the second conductive end 1220 is located on the back side of the second circuit board 12, the first conductive end 1210 and the second conductive end 1220 can be conducted to each other, and the first conductive end 1210 contacts conductively directly with the light-emitting element 111.

When the floodlight module 10 is installed on the first circuit board 23 of the receiving module 20, the second conductive end 1220 can be connected to the first circuit board 23. In this example, the second conductive end 1220 is conducted to a conductive end of the first circuit board 23 through the conductive member 60.

In specific implementation, it is necessary to apply conductive medium between the second conductive end 1220 of the second circuit board 12 of the floodlight module 10 and the first connection end 611 of the conductive member 60, such as conductive silver glue, this can establish a stable electrical connection between the second circuit board 12 and the conductive member 60. However, the commonly used conductive medium usually has fluidity, and it is inevitable that the conductive medium may overflow during the process of applying the conductive medium, which may cause the floodlight module 10 to be short-circuited and other faults. It is worth mentioning that the conductive medium can not only electrically connect the second circuit board 12 and the conductive member 60, but also fix the second circuit board 12 and the conductive member 60.

Correspondingly, in view of the above technical problems, in a preferred embodiment of the present invention, the support base 50 is further provided with at least one groove 500, wherein the groove 500 is respectively provided on an electrical connection site of the second circuit board 12 and the conductive member 60, this is used to prevent the overflow of the conductive medium from causing the floodlight module 10 to be short-circuited. More specifically, as shown in FIG. 5B, in a preferred embodiment of the present invention, the groove 500 is formed as a recess on an upper surface of the support base 50, and the first connection end 611 of the conductive member 60 is exposed to at least one of the grooves 500. Correspondingly, when the floodlight module 20 is mounted on the upper surface of the support base 50, the second conductive ends 1220 are respectively corresponded to and embedded in the groove 500 to contact with the conductive member 611 of the conductive member 60. Here, at least one of the grooves 500 is provided with a conductive medium, and when the floodlight module 10 is mounted on the support base 50, at least one of the grooves 500 is sealed by the second circuit board 12 to prevent the conductive medium from overflowing and causing short-circuit and other faults.

It is worth mentioning that when the floodlight module 10 is mounted on the support base 50, the groove 500 can be regarded as an alignment reference of the floodlight module 10, which is beneficial to make the floodlight module 10 be positioned and installed on the upper surface of the support base 50.

The conductive member 60 can be embedded in the support base 50, which can avoid short-circuit and other faults between the conductive members 60, and can also prevent the conductive member 60 from being oxidized.

When the support base 50 is integrally formed by molding, a penetrating hole may be formed in the support base 50, and then the conductive member 60 may be installed in the through hole.

In this example, the floodlight module 10 is still installed on the first circuit board 23 of the receiving module 20, but the floodlight module 10 and the receiving module 20 are connected to each other through the conductive member 60.

The support base 50 can be made by injection molding, molding, ceramic die-casting and other processes. The surface of the conductive body 61 of the conductive member 60 may be covered with a layer of insulating material.

Further, a part of the electronic components 30 are conductively connected to the first circuit board 23 of the receiving module 20, and a part of the electronic components 30 are conductively connected to the second circuit board 12 of the floodlight module 10. The at least part of the electronic component 30 that is conductively connected to the floodlight module 10 is arranged on the back side of the first circuit board 23 of the receiving module 20. In this way, the size of the second circuit board 12 of the floodlight module 10 can be reduced because the installation space reserved by the second circuit board 12 of the floodlight module 10 for the electronic components 30 can be reduced, so that an area size of the entire floodlight module 10 can be reduced, and the requirements for size can be reduced, by which the electronic device main body 2 provides an installation space for the TOF camera module 1. In other words, the electronic device main body 2 can accommodate more functional modules, such as a flashlight, and different types of camera modules, etc.

It is understandable that the electronic components 30 of the floodlight module 10 may be partially arranged on the back side of the first circuit board 23 of the receiving module 20, that is, the electronic components 30 of the floodlight assembly 100 may also be partially arranged on the front side of the second circuit board 12 of the floodlight module 10. Regardless of whether the electronic components 30 of the floodlight assembly 100 are located on the second circuit board 12 of the floodlight module 10 or the first circuit board 23 of the receiving module 20, the electronic components 30 of the floodlight assembly 100 are conductively connected to the second circuit board 12 of the floodlight module 10. The electronic components 30 of the floodlight assembly 100 located on the first circuit board 23 of the receiving module 20 are conductively connected to the second circuit board 12 of the floodlight module 10 through the first circuit board 23 of the receiving module 20 and the conductive member 60, and the electronic components 30 of the floodlight module 10 located on the second circuit board 12 of the floodlight module 10 are directly and conductively contacted with the second circuit board 12.

Further, the electronic components 30 of the receiving module assembly 200 are arranged on the front side of the first circuit board 23 of the receiving module 20, and are located around the first photosensitive element 22, and are respectively conductively connected to the first circuit board 23. The electronic components 30 of the receiving module assembly 200 may be partially arranged on the back side of the first circuit board 23 of the receiving module 20, thereby facilitating to reduce the size of the first circuit board 23 of the receiving module 20, because the installation space reserved by the first circuit board 23 of the receiving module 20 for the electronic components 30 of the receiving module assembly 200 can be reduced. The electronic components 30 of the receiving module assembly 200 located on the back side of the first circuit board 23 of the receiving module 20 are conductively connected to the first circuit board 23.

The receiving module 20 further includes a protective member 24, wherein the protective member 24 is located below the first circuit board 23, and the protective member 24 forms a protective cavity 240, and the electronic components 30 located on the back side of the first circuit board 23 are accommodated in the protective cavity 240.

In this way, on one hand, dust and other contaminants can be prevented from contacting the electronic components 30 located on the back side of the first circuit board 23, and on the other hand, the protective member 24 keeps the electronic components 30 in a suspended state. Specifically, the protective member 24 has a bottom side, and the electronic component 30 has a front side and a back side, wherein the front side of the electronic component 30 is connected to the back side of the first circuit board 23 of the receiving module 20, and the back side of the electronic component 30 is exposed in the protective cavity 240, and the position of the bottom side of the protective member 24 is lower than the back side of the electronic component 30, thereby when the TOF camera module 1 is installed on a circuit board of the electronic device main body 2, the TOF camera module 1 is supported on the electronic device main body 2 through the bottom side of the protective member 24, this prevents the electronic component 30 from being squeezed during the installation process, so that the electronic component 30 can be in a suspended state relative to the protective member 24, that is, the back side of the electronic component 30 may not be in contact with the electronic device main body 2, or the back side of the electronic component 30 may not have to bear large squeezing.

The electronic components 30 located on the first circuit board 23 of the receiving module 20 may be embedded on the back side of the first circuit board 23, or may be at least partially embedded on the first circuit board 23. Those skilled in the art can understand that the connection between the electronic components 30 located on the first circuit board 23 of the receiving module 20 and the first circuit board 23 here is only an example but not a limitation.

The protective member 24 may be installed on the back side of the first circuit board 23, or may be integrally formed with the first circuit board 23.

It is understandable that the protective member 24 can be made of a metal material, so that the TOF camera module 1 can be grounded through the protective member 24 to further provide the grounding performance of the TOF camera module 1. Meanwhile, the protective member 24 made of metal material can also enhance the heat dissipation performance on the position, and on one hand, it can help the first circuit board 23 to dissipate heat, and on the other hand, it can also help the electronic component 30 located on the front side of the first circuit board 23 or on the back side of the first circuit board 23 dissipate heat.

In some other examples of the present invention, the support base 50 is connected to the floodlight module 10 and the receiving module 20 by means of assembling.

The second circuit board 12 of the floodlight module 10 is conductively connected to the first circuit board 23 of the receiving module 20 through the conductive member 60 in the support base 50, therefore, the at least part of the electronic components 30 located on the back side of the first circuit board 23 are conductively connected to the second circuit board 12 of the floodlight module 10 through the first circuit board 23 and the conductive member 60.

In some other examples of the present invention, the protective member 24 is integrally formed on the first circuit board 23 of the receiving module 20 and is located on the back side of the first circuit board 23. The electronic components 30 located on the first circuit board 23 of the receiving module 20 are embedded on the protective member 24 during the integral forming process of the protective member 24. In this way, not only can the electronic components 30 be protected, but also a flat surface can be provided. The bottom side of the protective member 24 is the lower surface of the TOF camera module 1, so that the lower surface of the TOF camera module 1 formed by a molding process can be a flat surface, which is convenient for subsequent installation of the TOF camera module 1 and other devices described.

In other examples of the present invention, such as the example shown in FIG. 4B, the protective member 24 is provided on the back side of the first circuit board 23 of the receiving module 20 and the receiving module 20 further includes a protective layer 25, wherein the protective layer 25 is located in the protective cavity 240 and is formed of a protective material, the protective material can be a protective material such as glue, the protective layer 25 can seal the electronic component 30 to a certain extent. For example, if the electronic component 30 is permeated by water or is contaminated by other substances, a normal operation of the electronic component 30 will be affected.

It is understandable that in other examples of the present invention, the support base 50 may be integrally formed on the first circuit board 23 of the receiving module 20.

Further, the TOF camera module includes a cover 70, wherein the cover 70 is installed on the floodlight module 10 to protect the floodlight module 10, and at the same time, the light radiated by the light-emitting element 111 may pass through the cover 70 to propagate outward.

Figure 6A:
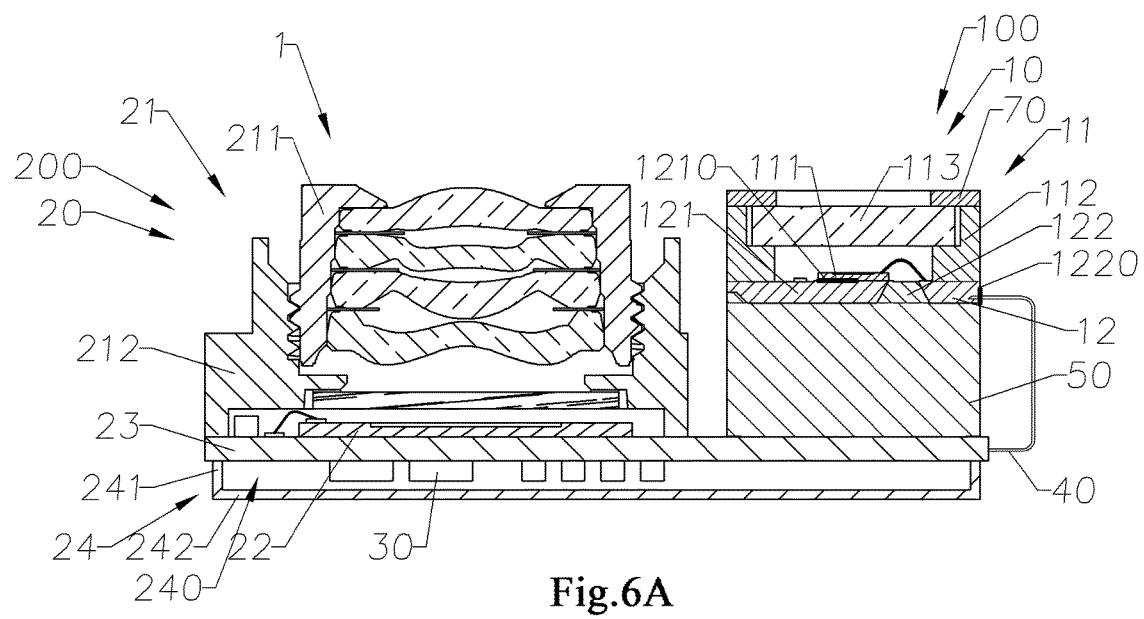
FIG. 6A is a schematic diagram of a TOF camera module according to a preferred embodiment of the present invention.

FIG. 6A shows a TOF camera module 1 according to a preferred embodiment of the present invention.

Specifically, the TOF camera module 1 includes a floodlight assembly 100 and a receiving module assembly 200, wherein the floodlight assembly 100 is conductively connected to the receiving module assembly 200, so the floodlight assembly 100 is used to emit light, and the light is reflected by at least one object, and the receiving module assembly 200 receives the reflected light, so as to obtain the depth information of the object based on a time difference or a phase difference between the emitted light and the reflected light.

The TOF camera module 1 includes a floodlight module 10, a receiving module 20, and at least one electronic component 30, wherein at least one of the electronic components 30 is conductively connected to the floodlight module 10, and at least one of the electronic components 30 is conductively connected to the receiving module 20.

Further, the floodlight assembly 100 includes the floodlight module 10 and at least one electronic component 30, wherein the electronic component 30 is conductively connected to the floodlight module 10. The receiving module assembly 200 includes the receiving module 20 and at least one electronic component 30, wherein the electronic component 30 is electrically connected to the receiving module 20.

The TOF camera module 1 further includes a flexible connector 40, wherein the flexible connector 40 is conductively connected to the floodlight module 10 and the receiving module 20, or in other words, the floodlight module 10 is conductively connected to the receiving module 20 through the flexible connector 40, and the receiving module 20 is conductively connected to the floodlight module 10 through the flexible connector 40.

The TOF camera module 1 further includes a support base 50, wherein the support base 50 supports the floodlight module 10 on the receiving module 20.

The receiving module 20 includes a first lens assembly 21, a first photosensitive element 22, and a first circuit board 23, wherein the first lens assembly 21 provides an optical path for light to pass through and reach the first photosensitive element 22 to perform photoelectric conversion, and the first photosensitive element 22 is conductively connected to the first circuit board 23.

The first lens assembly 21 includes a first lens 211 and a base 212, wherein the base 212 surrounds to form a light window, and the first lens 211 is supported on the base 212 and held at the photosensitive path of the first photosensitive element 22, so that the light passes through the first lens 211 and then reaches the first photosensitive element 22 through the light window.

The floodlight module 10 includes a projection assembly 11 and a second circuit board 12, wherein the projection assembly 11 is conductively connected to the second circuit board 12, and the second circuit board 12 is conductively connected to the first circuit board 23 of the receiving module 20. The second circuit board 12 may be a ceramic substrate, a rigid-flex board, a circuit board, or the like.

The projection assembly 11 further includes a light emitting element 111 and a bracket 112, wherein the light emitting element 111 is conductively supported on the second circuit board 12, and the bracket 112 is supported on the second circuit board 12 and the bracket 112 forms an accommodating cavity, and the light-emitting element 111 is accommodated in the accommodating cavity.

The projection assembly 11 may further include an optical auxiliary element 113, wherein the optical auxiliary element 113 is supported by the bracket 112 and held in a light-emitting path of the light-emitting element 111, and after the light-emitting element 111 emits light, the light passes through the optical auxiliary element 113 and then radiates outward. The optical auxiliary element 113 may be an optical diffractive element, and the optical auxiliary element 113 is used to assist the light emitting element 111 to radiate light outward, and the type of the optical auxiliary element 113 is not a limitation to the present invention.

Further, the bracket 112 may be integrally formed on the second circuit board 12, such as by ceramic sintering. The bracket 112 may also be installed on the second circuit board 12 by means of assembling.

The second circuit board 12 includes a conductive portion 121 and an insulating portion 122, wherein the insulating portion 122 is connected to the conductive portion 121, and the insulating portion 122 and the bracket 112 can be integrally formed on the conductive portion 121, such as integrally formed by molding.

It can be understood that the bracket 112 of the floodlight module 10 and the insulating portion 122 of the second circuit board 12 may be made of same or different materials. The heat dissipation performance of the material of the second circuit board 12 of the floodlight module 10 may be better than or close to that of the material of the bracket 112.

Further, for the entire TOF camera module 1, the height of the floodlight module 10 is generally lower than the height of the receiving module 20, and for the floodlight module 10, the height can be adjusted by the height of the bracket 112; the higher the height of the bracket 112 is, the higher is the height of the floodlight module 10, and the lower the height of the bracket 112 is, the lower is the height of the floodlight module 10.

In some embodiments of the present invention, the height of the floodlight module 10 is within 4.5 mm. In some examples of the present invention, the height of the floodlight module 10 is between 4 mm and 4.5 mm.

In this example, the support base 50 is integrally formed on the second circuit board 12 of the floodlight module 10, and after the second circuit board 12 is formed, the support base 50 is integrally formed on the second circuit board 12. Further, the support base 50 and the second circuit board 12 are made of different materials. It is worth mentioning that, in this example, the support base 50 is integrally formed on the base 212, in a length direction, the base 212 and the support base 50 provides a solid support for the first lens 211 and the floodlight module 10, respectively. The integrated support base 50 and the base 212 make the combination between the two more stable.

Furthermore, in this example, the bracket 112, the support base 50 and the second circuit board 12 are integrally formed, so that the floodlight module 10 has a solid structure. More specifically, the bracket 112, the support base 50, and the second circuit board 12 are integrally formed by a ceramic process, and then the floodlight module 10 with the support base 50 is installed on the first circuit board 23.

Optionally, the bracket 112 and the support base 50 may be installed on the second circuit board 12 respectively. The material of the bracket 112, the support base 50, and the insulating portion 12 of the second circuit board 12 may be the same or different.

Specifically, the second circuit board 12 of the floodlight module 10 is conductively connected to the first circuit board 23 of the receiving module 20 through the flexible connector 40.

The second circuit board 12 is provided with at least one first conductive end 1210 and at least one second conductive end 1220, wherein the first conductive end 1210 is located on the front side of the second circuit board 12, and the second conductive end 1220 is located on a side of the second circuit board 12, the first conductive ends 1210 and the second conductive ends 1220 can be connected to each other, and the first conductive ends 1210 are conductively and directly contacted with the light-emitting element 111. In this example, the first conductive end 1210 is formed on an upper surface of the conductive portion 121, and the second conductive end 1220 is formed on a side of the conductive portion 121.

When the floodlight module 10 is installed on the first circuit board 23 of the receiving module 20, the second conductive end 1220 can be connected to the first circuit board 23. In this example, the first conductive end 1210 is electrically connected to the first circuit board 23 through the flexible connector 40.

Further, a part of the electronic components 30 are conductively connected to the first circuit board 23 of the receiving module 20, and a part of the electronic components 30 are conductively connected to the second circuit board 12 of the floodlight module 10. The at least part of the electronic component 30 that is conductively connected to the floodlight module 10 is arranged on the back side of the first circuit board 23 of the receiving module 20. In this way, the size of the second circuit board 12 of the floodlight module 10 can be reduced because the installation space reserved by the second circuit board 12 of the floodlight module 10 for the electronic component 30 can be reduced, so that an area size of the entire floodlight module 10 can be reduced, and the requirements for size can be reduced, by which the electronic device main body 2 provides an installation space of the TOF camera module 1. In other words, the electronic device main body 2 can accommodate more functional modules, such as a flashlight, and different types of camera modules, etc.

It is understandable that the electronic components 30 of the floodlight assembly 100 may be partially arranged on the back side of the first circuit board 23 of the receiving module 20, that is, the electronic components 30 of the floodlight assembly 100 may also be partially arranged on the front side of the second circuit board 12 of the floodlight module 10. Regardless of whether the electronic components 30 of the floodlight assembly 100 are located on the second circuit board 12 of the floodlight module 10 or the first circuit board 23 of the receiving module 20, the electronic components 30 of the floodlight assembly 100 are conductively connected to the second circuit board 12 of the floodlight module 10. The electronic components 30 of the floodlight assembly 100 located on the first circuit board 23 of the receiving module 20 is conductively connected to the second circuit board 12 of the floodlight module 10 through the first circuit board 23 of the receiving module 20 and the flexible connector 40, and the electronic components 30 of the floodlight assembly 100 located on the second circuit board 12 of the floodlight module 10 are directly and conductively contacted to the second circuit board 12.

Further, the electronic components 30 of the receiving module assembly 200 are arranged on the front side of the first circuit board 23 of the receiving module assembly 200, are located around the first photosensitive element 22, and are respectively conductively connected to the first circuit board 23. The electronic components 30 of the receiving module assembly 200 may be partially arranged on the back side of the first circuit board 23 of the receiving module 20, thereby facilitating to reduce the size of the first circuit board 23 of the receiving module 20, because the installation space reserved by the first circuit board 23 of the receiving module 20 for the electronic components 30 of the receiving module assembly 200 can be reduced. The electronic components 30 of the receiving module assembly 200 located on the back side of the first circuit board 23 of the receiving module 20 are conductively connected to the first circuit board 23.

The receiving module 20 further includes a protective member 24, wherein the protective member 24 is located below the first circuit board 23, and the protective member 24 forms a protective cavity 240, wherein the electronic components 30 located on the back side of the first circuit board 23 are accommodated in the protective cavity 240.

It is worth mentioning that, in this example, the protective member 24 includes a protective surrounding wall 241 and a protective bottom wall 242, the protective surrounding wall 241 surrounds to form the protective cavity 240, and the protective bottom wall 242 closes an opening of the protective cavity 240, and the protective bottom wall 242 is connected to the protective surrounding wall 241, so that contaminants cannot enter the protective cavity 240 from a bottom side upward to cause a contamination to the electronic components 30.

The electronic components 30 located on the first circuit board 23 of the receiving module 20 may be mounted on the back side of the first circuit board 23, or may be at least partially embedded on the first circuit board 23. Those skilled in the art can understand that the connection between the electronic components 30 located on the first circuit board 23 of the receiving module 20 and the first circuit board 23 here is only an example but not a limitation. The protective member 24 may be installed on the back side of the first circuit board 23, or may be integrally formed with the first circuit board 23.

In some examples of the present invention, the range of the height of the protective member 24 is 0.35 mm~0.5 mm. In some examples of the present invention, the height of the protective member 24 is 0.45 mm.

In this example, the area size of the TOF camera module 1 is within 12 mm*7 mm. In some examples of the present invention, the area size of the TOF camera module 1 is within 11.6 mm*6.5 mm.

Further, the TOF camera module includes a cover 70, wherein the cover 70 is installed on the floodlight module 10 to protect the floodlight module 10, and at the same time, the light radiated by the light-emitting element 111 may pass through the cover 70 to propagate outward.

Figure 6B:
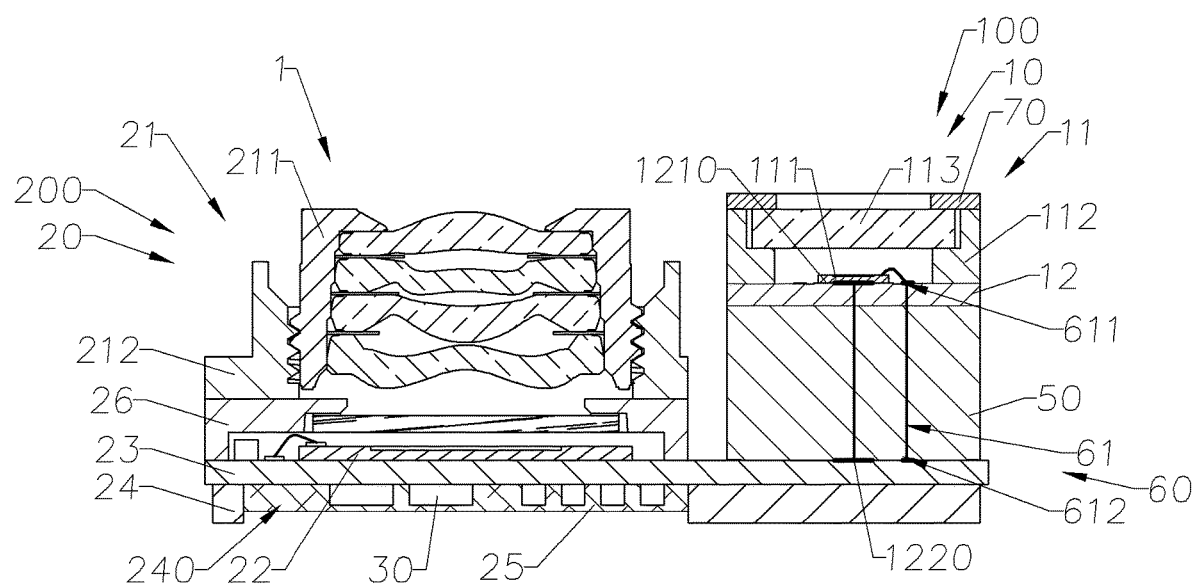
FIG. 6B is a schematic diagram of a TOF camera module according to a preferred embodiment of the present invention.

FIG. 6B shows a modified embodiment of the TOF camera module 1 according to the above-mentioned preferred embodiment of the present invention.

Specifically, the TOF camera module 1 includes a floodlight assembly 100 and a receiving module assembly 200, wherein the floodlight assembly 100 is conductively connected to the receiving module assembly 200, so the floodlight assembly 100 is used to emit light, and the light is reflected by at least one object, and the receiving module assembly 200 receives the reflected light, so as to obtain the depth information of the object based on a time difference or a phase difference between the emitted light and the reflected light.

The TOF camera module 1 includes a floodlight module 10, a receiving module 20, and at least one electronic component 30, wherein at least one of the electronic components 30 is conductively connected to the floodlight module 10, and at least one of the electronic components 30 is conductively connected to the receiving module 20.

Further, the floodlight assembly 100 includes the floodlight module 10 and at least one electronic component 30, wherein the electronic component 30 is conductively connected to the floodlight module 10. The receiving module assembly 200 includes the receiving module 20 and at least one electronic component 30, wherein the electronic component 30 is electrically connected to the receiving module 20.

The TOF camera module 1 further includes a support base 50, wherein the support base 50 supports the floodlight module 10 on the receiving module 20. The TOF camera module 1 further includes a conductive member 60, wherein the conductive member 60 includes a conductive body 61 and has a first connection end 611 and a second connection end 612, wherein the first connection end 611 and the second connecting ends 612 are respectively located at two ends of the conductive body 61 and are conducted to the floodlight module 10 and the receiving module 20 respectively. The conductive body 61 can transmit electrical signals. The support base 50 is integrally formed on the conductive member 60.

The support base 50 may be obtained by injection molding, molding, ceramic die-casting and other processes, and the conductive member 60 is wrapped by injection molding material, molding material or ceramic die-casting material.

The receiving module 20 includes a first lens assembly 21, a first photosensitive element 22, and a first circuit board 23, wherein the first lens assembly 21 provides an optical path for light to pass through and reach the first photosensitive element 22 to perform photoelectric conversion, and the first photosensitive element 22 is conductively connected to the first circuit board 23.

The first lens assembly 21 includes a first lens 211 and a base 212, wherein the base 212 surrounds to form a light window, and the first lens 211 is supported on the base 212 and held at a photosensitive path of the first photosensitive element 22, so that light passes through the first lens 211 and then reaches the first photosensitive element 22 through the light window. The receiving module 20 includes a base bracket 26 supported on the first circuit board 23. The base 212 is supported by the base bracket 26.

It is worth mentioning that, in this example, the support base 50 is integrally formed on the base 212, in a length direction, the base 212 and the support base 50 provide a solid support for the first lens 211 and the floodlight module 10, respectively. The integrated support base 50 and the base 212 make the combination between the two more stable.

Furthermore, in this example, the bracket 112, the support base 50 and the second circuit board 12 are integrally formed, so that the floodlight module 10 has a solid structure. More specifically, the bracket 112, the support base 50, and the second circuit board 12 are integrally formed by a ceramic process, and then the floodlight module 10 with the support base 50 is installed on the first circuit board 23.

The floodlight module 10 includes a projection assembly 11 and a second circuit board 12, wherein the projection assembly 11 is conductively connected to the second circuit board 12, and the second circuit board 12 is conductively connected with the first circuit board 23 of the receiving module 20. Specifically, the second circuit board 12 of the floodlight module 10 is conductively connected to the first circuit board 23 of the receiving module 20 through the conductive member 60. The second circuit board 12 may be a ceramic substrate, a rigid-flex board, a circuit board, or the like.

The projection assembly 11 further includes a light emitting element 111 and a bracket 112, wherein the light emitting element 111 is conductively supported on the second circuit board 12, and the bracket 112 is supported on the second circuit board 12 and the bracket 112 forms an accommodating cavity, wherein the light-emitting element 111 is accommodated in the accommodating cavity.

The projection assembly 11 may further include an optical auxiliary element 113, wherein the optical auxiliary element 113 is supported by the bracket 112 and held in a light-emitting path of the light-emitting element 111, and after the light-emitting element 111 emits light, the light passes through the optical auxiliary element 113 and then radiates outward. The optical auxiliary element 113 may be an optical diffractive element, and the optical auxiliary element 113 is used to assist the light emitting element 111 to radiate light outward, and the type of the optical auxiliary element 113 is not a limitation to the present invention.

Further, the bracket 112 may be integrally formed on the second circuit board 12, such as by ceramic sintering. The bracket 112 may also be installed on the second circuit board 12 by means of assembling.

Further, the support base 50 and the base 212 of the receiving module 20 are integrally formed. It may be that after the base 212 is formed, the support base 50 is integrally formed on the base 212, or it may be that the support base 50 and the base 212 of the receiving module 20 are integrally formed. In other words, the materials of the support base 50 and the base 212 may be same or different.

Further, for the entire TOF camera module 1, the height of the floodlight module 10 is generally lower than the height of the receiving module 20, and for the floodlight module 10, the height can be adjusted by the height of the bracket 112, the higher the height of the bracket 112 is, the higher is the height of the floodlight module 10, and the lower the height of the support 112 is, the lower is the height of the floodlight module 10.

In some embodiments of the present invention, the height of the floodlight module 10 is within 4.5 mm. In some examples of the present invention, the height of the floodlight module 10 is between 4 mm and 4.5 mm.

In this example, the second circuit board 12 of the floodlight module 10 is conductively connected to the first circuit board 23 of the receiving module 20 through the conductive member 60. The second circuit board 12 has a front side and a back side, wherein the front side of the second circuit board 12 is used to support the light emitting element 111, and the light emitting element 111 is conductively connected to the second circuit board 12. The first circuit board 23.

The first circuit board 23 of the receiving module 20 has a front side and a back side, wherein the front side of the first circuit board 23 is conductively connected to the first photosensitive element 22, the front side of the first circuit board 23 and the back side of the first circuit board 23 are opposed to each other.

The TOF camera module 1 is provided with at least one first conductive end 1210 and at least one second conductive end 1220, wherein the first conductive end 1210 is located on the front side of the second circuit board 12, and the second conductive ends 1220 are located on a back side of the support base 50, and the back side of the support base 50 directly contacts the front side of the first circuit board 23, so that the second conductive end 1220 is directly conducted to the first circuit board 23, thus, the first circuit board 12 of the floodlight module 10 can be conducted to the first circuit board 23 of the receiving module 20. It can be understood that the conduction between the support base 50 and the second circuit board 12 of the floodlight module 10 may be a penetrating conductive member, which is not shown in the figure.

The floodlight module 10 and the support base 50 are installed on the first circuit board 23 of the receiving module 20, and the second conductive end 1220 can be conducted to the first circuit board 23.

Further, a part of the electronic components 30 are conductively connected to the first circuit board 23 of the receiving module 20, and a part of the electronic components 30 are conductively connected to the second circuit board 12 of the floodlight module 10. The at least part of the electronic component 30 that is conductively connected to the floodlight module 10 is arranged on the back side of the first circuit board 23 of the receiving module 20. In this way, the size of the second circuit board 12 of the floodlight module 10 can be reduced because the installation space reserved by the second circuit board 12 of the floodlight module 10 for the electronic component 30 can be reduced, so that an area size of the entire floodlight module 10 can be reduced, and the requirements for size can be reduced, by which the electronic device main body 2 provides an installation space for the TOF camera module 1. In other words, the electronic device main body 2 can accommodate more functional modules, such as a flashlight, and different types of camera modules, etc.

It is understandable that the electronic components 30 of the floodlight assembly 100 may be partially arranged on the back side of the first circuit board 23 of the receiving module 20, that is, the electronic components 30 of the floodlight assembly 100 may also be partially arranged on the front side of the second circuit board 12 of the floodlight module 10. Regardless of whether the electronic components 30 of the floodlight assembly 100 are located on the second circuit board 12 of the floodlight module 10 or the first circuit board 23 of the receiving module 20, the electronic components 30 of the floodlight assembly 100 are conductively connected to the second circuit board 12 of the floodlight module 10. The electronic components 30 of the floodlight assembly 100 located on the first circuit board 23 of the receiving module 20 is conductively connected to the second circuit board 12 of the floodlight module 10 through the first circuit board 23 of the receiving module 20 and the conductive member 60, and the electronic components 30 of the floodlight assembly 100 located on the second circuit board 12 of the floodlight module 10 are directly and conductively contacted with the second circuit board 12.

Further, the electronic components 30 of the receiving module assembly 200 are arranged on the front side of the first circuit board 23 of the receiving module assembly 200, are located around the first photosensitive element 22, and are respectively conductively connected to the first circuit board 23. The electronic components 30 of the receiving module assembly 200 may be partially arranged on the back side of the first circuit board 23 of the receiving module 20, thereby facilitating to reduce the size of the first circuit board 23 of the receiving module 20, because the installation space reserved by the first circuit board 23 of the receiving module 20 for the electronic components 30 of the receiving module assembly 200 can be reduced. The electronic components 30 of the receiving module assembly 200 located on the back side of the first circuit board 23 of the receiving module 20 are conductively connected to the first circuit board 23.

The receiving module 20 further includes a protective member 24, wherein the protective member 24 is located below the first circuit board 23, and the protective member 24 forms a protective cavity 240, and the electronic components 30 located on the back side of the first circuit board 23 are accommodated in the protective cavity 240. On one hand, this can prevent dust and other contaminants from contacting the electronic components 30 located on the back side of the first circuit board 23, on the other hand, the protective member 24 keeps the electronic component 30 in a suspended state. Specifically, the protective member 24 has a bottom side, the electronic component 30 has a front side and a back side, and the front side of the electronic component 30 is connected to the back side of the first circuit board 23 of the receiving module 20, the back side of the electronic component 30 is exposed in the protective cavity 240, and the position of the bottom side of the protective member 24 is lower than that of the electronic component 30, so that when the TOF camera module 1 is installed on a circuit board of the electronic device main body 2, the TOF camera module 1 is supported on the electronic device main body 2 via the bottom side of the protective member 24, this prevents the electronic component 30 from being squeezed during the installation process, so that the electronic component 30 can be in a suspended state relative to the protective member 24, that is, the back side of the electronic component 30 may not be in contact with the electronic device main body 2, or the back side of the electronic component 30 may not have to bear large squeezing.

The electronic components 30 located on the first circuit board 23 of the receiving module 20 may be mounted on the back side of the first circuit board 23, or may be at least partially embedded on the first circuit board 23. Those skilled in the art can understand that the connection between the electronic components 30 located on the first circuit board 23 of the receiving module 20 and the first circuit board 23 here is only an example but not a limitation.

The protective member 24 may be installed on the back side of the first circuit board 23, or may be integrally formed with the first circuit board 23.

It is understandable that the protective member 24 can be made of metal material, so that the TOF camera module 1 can be grounded through the protective member 24 to further provide the grounding performance of the TOF camera module 1. Meanwhile, the protective member 24 made of metal material can also enhance the heat dissipation performance of the position, on one hand, it can help the first circuit board 23 to dissipate heat, and on the other hand, it can also help the electronic components 30 located on the front side of the first circuit board 23 or on the back side of the first circuit board 23 dissipate heat.

In some other examples of the present invention, the support base 50 is connected to the floodlight module 10 and the receiving module 20 by means of assembling.

The second circuit board 12 of the floodlight module 10 is conductively connected to the first circuit board 23 of the receiving module 20 through the conductive member 60 in the support base 50, therefore, the at least part of the electronic components 30 located on the back side of the first circuit board 23 are conductively connected to the second circuit board 12 of the floodlight module 10 through the first circuit board 23 and the conductive member 60.

In some other examples of the present invention, the protective member 24 is integrally formed on the first circuit board 23 of the receiving module 20 and is located on the back side of the first circuit board 23. The electronic components 30 located on the first circuit board 23 of the receiving module 20 are embedded on the protective member 24 during the integral forming process of the protective member 24. In this way, not only can the electronic components 30 be protected, but also a flat surface can be provided. The bottom side of the protective member 24 is just the bottom surface of the TOF camera module 1, so that the bottom surface of the TOF camera module 1 formed by a molding process can be a flat surface, which is convenient for subsequent operations for the installation of the TOF camera module 1 and other devices described.

In this example, the receiving module 20 further includes a protective layer 25, wherein the protective layer 25 is located in the protective cavity 240 and is formed of a protective material, the protective material may be a protective material such as glue, the protective layer 25 can seal the electronic component 30 to a certain extent, for example, to prevent the electronic component 30 from being contaminated by water or other substances, thereby affecting the normal operation of the electronic component 30. The protective layer 25 may completely cover the electronic component 30 or may expose at least part of the electronic component 30.

It is understandable that in other examples of the present invention, the support base 50 may be integrally formed on the first circuit board 23 of the receiving module 20.

An embodiment of the second circuit board 12 of the floodlight module 10 is shown in FIG. 7A. Specifically, the second circuit board 12 includes a conductive portion 121 and an insulating portion 122, wherein the insulating portion 122 is connected to the conductive portion 121 to perform an insulating function. Optionally, the insulating portion 122 is integrally formed as the insulating portion 122.

The first conductive end 1210 and the second conductive end 1220 are respectively formed on an upper surface and a lower surface of the conductive portion 121. The second conductive end 1220 may also be formed on a side surface of the conductive portion 121.

The conductive portion 121 further includes a first conductive part 1211 and a second conductive part 1212, wherein the first conductive part 1211 and the second conductive part 1212 are isolated by the insulating portion 122 to avoid the first conductive part 1211 and the second conductive part 1212 to be short-circuited when they are simultaneously conducted.

The first conductive part 1211 can not only play a role of conduction, but also play a role of heat dissipation to transfer the heat generated by the light-emitting element 112 from one side of the second circuit board 12 to the other side for dissipation. Preferably, the first conductive part 1211 is larger than the second conductive part 1212, wherein the first conductive part 1211 can be used to support the light emitting element 112. The first conductive part 1211 can be connected to an electrode of the light emitting element 112, and the second conductive part 1212 can be connected to another electrode of the light emitting element 112 to form a loop after being powered on.

Preferably, the first conductive part 1211 penetrates the insulating portion 122 in a height direction, the first conductive end 1210 is formed on an upper surface of the first conductive part 1211, and the second conductive end 1220 is formed on a lower surface of the first conductive part 1211.

It can be understood that in some other examples of the present invention, the second conductive end 1220 is formed on a sie surface of the first conductive part 1211.

The conductive portion 121 may further include a third conductive part 1213 and a fourth conductive part 1214, wherein the third conductive part 1213 and the fourth conductive part 1214 can be used to conductively support other electronic components 115, for example, it is used to conduct components such as PD elements (light intensity detection), capacitance resistance, NTC (temperature control), etc.

Those skilled in the art can understand that the conductive portion 121 may also include a fifth conductive part or even more conductive parts. The structure and arrangement of the conductive portion 121 can be flexibly designed according to the requirements.

Figure 7B:
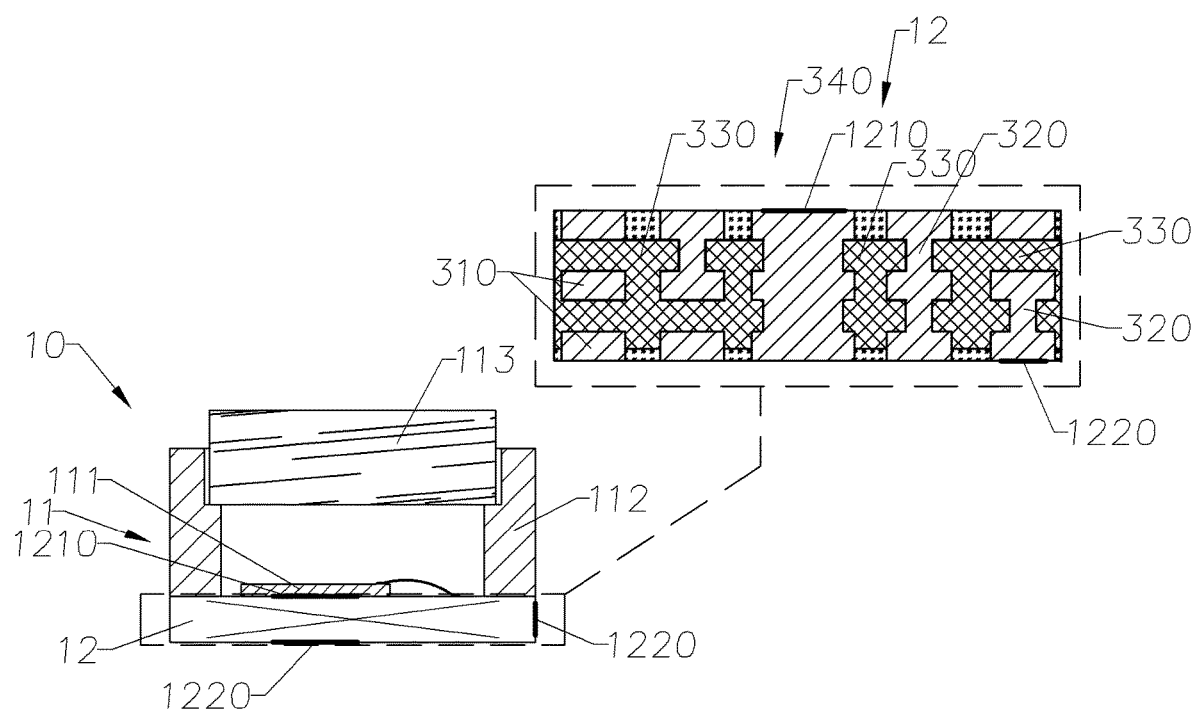
FIG. 7B is a schematic diagram of a floodlight module according to a preferred embodiment of the present invention.

An embodiment of the second circuit board 12 of the floodlight module 10 is shown in FIG. 7B, the second circuit board 12 includes a conductive layer 310, a circuit layer 320, and an insulating layer 330 and a heat dissipation portion 340, wherein the insulating layer 330 is connected to the conductive layer 310 and the circuit layer 320, respectively, and the heat dissipation portion 340 is formed on the conductive layer 310 and the circuit layer 320.

Preferably, the first conductive end 1210 is formed on an upper surface of the heat dissipation portion 340, and the second conductive end 1220 is formed on the lower surface of the heat dissipation portion 340. The conductive layer 310 and the circuit layer 320 are respectively developed by light irradiation and then formed by electroplating. Optionally, the second conductive end 1220 may also be formed on a side surface.

According to another aspect of the present invention, the present invention provides a method for assembling a TOF camera module 1, which includes the following steps:

providing the floodlight module 10 and the receiving module 20; and arranging at least one electronic component 30 on a back side of the first circuit board 23 of the receiving module 20 in a manner of being electrically connected to the second circuit board 12 of the floodlight module 10.

According to an embodiment of the present invention, the electronic component 30 located on the back side of the first circuit board 23 is conductively connected to the second circuit board 12 through the flexible connector 40.

According to an embodiment of the present invention, the electronic component 30 located on the back side of the first circuit board 23 is conductively connected to the second circuit board 12 through the conductive member 60 located inside the support base 50.

According to an embodiment of the present invention, the floodlight module 10 is directly installed on the first circuit board 23 of the receiving module 20.

According to an embodiment of the present invention, wherein the floodlight module 10 is installed on the first circuit board 23 of the receiving module 20 through the supporting base 50.

According to an embodiment of the present invention, the support base 50 is integrally formed on the first circuit board 23 of the floodlight module 10.

According to an embodiment of the present invention, the support base 50 is integrally formed on the base 212 of the receiving module 20.

According to an embodiment of the present invention, the support base 50 is integrally formed on the first circuit board 23 of the receiving module 20.

Those skilled in the art should understand that the above description and the embodiments of the present invention shown in the accompanying drawings are only examples but not limitations to the present invention. The purpose of the present invention has been completely and effectively achieved. The functions and structural principles of the present invention have been shown and explained in the embodiments. Without departing from the principles, the embodiments of the present invention may have any variation or modification.

The invention claimed is:

1. A TOF camera module, characterized by comprising:
a floodlight module;
a receiving module;
a plurality of electronic components including resistors or capacitors, wherein the receiving module includes a first lens assembly, a first photosensitive element, and a first circuit board, and the first lens assembly provides an optical path for light to pass through and reach the first photosensitive element to perform photoelectric conversion, and the first photosensitive element is conductively connected to the first circuit board, and the floodlight module is conductively connected to the receiving module, and the first circuit board has a front side and a back side, and the first assembly and first photosensitive element are located on the front side of the first circuit board, and at least one of the plurality of electronic components including resistors or capacitors is located on the back side of the first circuit board of the receiving module,
wherein the floodlight module includes a light-emitting element, a bracket and a second circuit board, and the light-emitting element is conductively connected to the second circuit board, and the bracket is supported on the second circuit board and surrounds the light-emitting element, and the floodlight module is supported on the front side of first circuit board of the receiving module;
wherein the TOF camera module further comprises:
a support base, wherein the support base is located between the second circuit board and the first circuit board, and the floodlight module is supported on the first circuit board through the support base, and the support base is integrally formed on the second circuit board of the floodlight module through a ceramic sintering process, and the support base, the bracket and the second circuit board are integrally formed by a ceramic sintering process;

a conductive member, wherein the conductive member is located on the support base, and the conductive member conducts the first circuit board with the second circuit board, and the conductive member is wrapped in the support base; and a protective member, wherein the protective member is located on the back side of the first circuit board, and the protective member forms a protective cavity, and the electronic components located on the back side of the first circuit board are accommodated in the protective cavity;

wherein a height of the protective member ranges from 0.35 mm to 0.5 mm, and a height of the floodlight module is not greater than 4.5 mm, and an area size range of the TOF camera module is not greater than 10.5 mm*6.6 mm.

2. The TOF camera module according to claim 1, wherein the at least one of the electronic components located on the back side of the first circuit board is conductively connected to the receiving module or the floodlight module.

3. The TOF camera module of claim 1, wherein at least one of the electronic components located on the back side of the first circuit board is conductively connected to the receiving module and the at least one electronic component located on the back side of the first circuit board is conductively connected to the floodlight module.

4. The TOF camera module of claim 1, wherein the second circuit board of the floodlight module is directly and conductively connected to the first circuit board of the receiving module.

5. The TOF camera module according to claim 4, further includes a flexible connector, wherein the second circuit board of the floodlight module is conductively connected to the first circuit board of the receiving module through the flexible connector.

6. The TOF camera module of claim 1, wherein the bracket of the floodlight module is integrally formed on the second circuit board by ceramic sintering.

7. The TOF camera module of claim 1, wherein at least a part of the second circuit board of the floodlight module is located above the first circuit board.

8. The TOF camera module according to claim 1, wherein the support base has an upper surface, and the second circuit board is supported on the upper surface, and the support base has a groove, and the groove is formed on the upper surface, and the conductive member has a first conductive end and a second conductive end, and the second conductive end is conductively connected to the second circuit board and is accommodated in the groove, and the first conductive end is conductively connected to the first circuit board.

9. The TOF camera module according to claim 1, further includes a flexible connector, wherein the first circuit board is conductively connected to the second circuit board through the flexible connector, and the at least part of the electronic components located on the back side of the first circuit board is conductively connected to the second circuit board through the flexible connector.

10. An electronic device, characterized by comprising:
an electronic device main body; and
a TOF camera module according to claim 1, wherein the TOF camera module is provided on the electronic device main body.

* * * * *